United States Patent
Bergström et al.

(10) Patent No.: US 9,832,709 B2
(45) Date of Patent: Nov. 28, 2017

(54) TERMINAL, NETWORK NODE AND METHODS THEREIN FOR ENABLING ACCESS TO A RADIO COMMUNICATIONS NETWORK

(71) Applicant: Telefonaktiebolaget L M Ericsson (publ), Stockholm (SE)

(72) Inventors: Mattias Tan Bergström, Stockholm (SE); Oumer Teyeb, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 198 days.

(21) Appl. No.: 14/761,330

(22) PCT Filed: Jan. 17, 2014

(86) PCT No.: PCT/SE2014/050054
§ 371 (c)(1),
(2) Date: Jul. 16, 2015

(87) PCT Pub. No.: WO2014/112940
PCT Pub. Date: Jul. 24, 2014

(65) Prior Publication Data
US 2015/0358891 A1 Dec. 10, 2015

Related U.S. Application Data

(60) Provisional application No. 61/753,466, filed on Jan. 17, 2013.

(51) Int. Cl.
*H04W 24/00* (2009.01)
*H04W 48/08* (2009.01)
(Continued)

(52) U.S. Cl.
CPC ........... *H04W 48/08* (2013.01); *H04W 48/18* (2013.01); *H04W 76/02* (2013.01); *H04W 88/02* (2013.01)

(58) Field of Classification Search
CPC ..... H04W 48/08; H04W 76/02; H04W 48/18; H04W 88/02
See application file for complete search history.

(56) References Cited

U.S. PATENT DOCUMENTS

| 7,991,381 B1* | 8/2011 | Dunne | B60R 25/00 379/33 |
| 8,965,363 B1* | 2/2015 | Umamaheswaran | H04W 8/18 455/411 |

(Continued)

FOREIGN PATENT DOCUMENTS

| WO | 2008135851 A1 | 11/2008 |
| WO | 2009012416 A2 | 1/2009 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.4.0, Dec. 2012, 1-208.

(Continued)

*Primary Examiner* — Jay P Patel
(74) *Attorney, Agent, or Firm* — Murphy, Bilak & Homiller, PLLC

(57) ABSTRACT

Embodiments herein disclose a method in a terminal (10) for enabling access to a radio communications network, wherein the terminal (10) is served in a cell of the radio communications network. The terminal (10) receives an indicator from a base station (12), which indicator indicates a set of settings to use in the cell, and the settings relate to access of the radio communications network.

25 Claims, 22 Drawing Sheets

(51) Int. Cl.
*H04W 48/18* (2009.01)
*H04W 76/02* (2009.01)
*H04W 88/02* (2009.01)

(56) References Cited

U.S. PATENT DOCUMENTS

| | | | | |
|---|---|---|---|---|
| 9,319,985 | B2* | 4/2016 | Vangala | H04W 52/0254 |
| 9,497,740 | B2* | 11/2016 | Gupta | H04W 52/0258 |
| 2004/0236849 | A1* | 11/2004 | Cooper | H04W 8/26 |
| | | | | 709/224 |
| 2005/0130625 | A1* | 6/2005 | Chong | H04M 15/00 |
| | | | | 455/406 |
| 2010/0003980 | A1* | 1/2010 | Rune | H04W 48/16 |
| | | | | 455/436 |
| 2010/0323698 | A1 | 12/2010 | Rune et al. | |
| 2011/0167470 | A1 | 7/2011 | Walker et al. | |
| 2012/0069749 | A1* | 3/2012 | Famolari | G06Q 30/02 |
| | | | | 370/252 |
| 2012/0324100 | A1* | 12/2012 | Tomici | H04L 45/123 |
| | | | | 709/224 |
| 2013/0021968 | A1* | 1/2013 | Reznik | H04W 36/026 |
| | | | | 370/328 |
| 2013/0070594 | A1* | 3/2013 | Garcia Martin | H04W 28/08 |
| | | | | 370/235 |
| 2013/0088966 | A1* | 4/2013 | Mahkonen | H04L 63/12 |
| | | | | 370/235 |
| 2013/0170486 | A1* | 7/2013 | Wang | H04W 48/18 |
| | | | | 370/342 |
| 2013/0210385 | A1* | 8/2013 | Ahmed | H04W 12/06 |
| | | | | 455/411 |
| 2013/0265985 | A1* | 10/2013 | Salkintzis | H04W 48/08 |
| | | | | 370/331 |
| 2013/0288668 | A1* | 10/2013 | Pragada | H04W 12/06 |
| | | | | 455/426.1 |
| 2014/0064068 | A1* | 3/2014 | Horn | H04W 28/0289 |
| | | | | 370/230 |
| 2014/0071854 | A1* | 3/2014 | Xiang | H04W 48/16 |
| | | | | 370/254 |
| 2014/0106743 | A1* | 4/2014 | Ferraro Esparza | H04W 48/08 |
| | | | | 455/426.1 |
| 2015/0009826 | A1* | 1/2015 | Ma | H04W 28/0268 |
| | | | | 370/235 |
| 2015/0142986 | A1* | 5/2015 | Reznik | H04L 67/16 |
| | | | | 709/228 |
| 2015/0282058 | A1* | 10/2015 | Forssell | H04W 48/18 |
| | | | | 455/552.1 |
| 2015/0319670 | A1* | 11/2015 | Jung | H04W 36/14 |
| | | | | 370/331 |
| 2016/0112896 | A1* | 4/2016 | Karampatsis | H04W 28/0252 |
| | | | | 370/230.1 |

FOREIGN PATENT DOCUMENTS

| | | |
|---|---|---|
| WO | 2009104435 A1 | 8/2009 |
| WO | 2009155365 A2 | 12/2009 |
| WO | 2010141788 A2 | 12/2010 |
| WO | 2011110108 A1 | 9/2011 |
| WO | 2012093882 A2 | 7/2012 |
| WO | 2012154089 A1 | 11/2012 |
| WO | 2012154506 A1 | 11/2012 |
| WO | 2012176602 A1 | 12/2012 |
| WO | 2013170751 A1 | 11/2013 |
| WO | 2013176588 A1 | 11/2013 |

OTHER PUBLICATIONS

3GPP, "3rd Generation Partnership Project; Technical Specification Group Services and System Aspects; Architecture enhancements for non-3GPP accesses (Release 8)", 3GPP TS 23.402 V8.10.0, Mar. 2012, 1-199.

IEEE, "IEEE Standard 802.11n", IEEE Standard for Information Technology-Telecommunications and Information Exchange Between Systems—Local and Metropolitan Area Networks—Specific Requirements, Part 11: Wireless LAN Medium Access Control (MAC) and Physical Layer (PHY) Specifications, Oct. 29, 2009, 1-536.

IEEE, "IEEE Standard for Information Technology—Telecommunications and Information Exchange Between Systems—Local and Metropolitan Area Networks—Specific Requirements", IEEE Std 802.11u, Part 11: Wireless LAN Medium Access Control (MAC) and Physical Layer (PHY) Specifications, Amendment 9: Interworking with External Networks, Feb. 25, 2011, 1-208.

Rigney, C. et al., "Remote Authentication Dial in User Service (RADIUS)", Network Working Group, Request for Comments: 2865, Jun. 2000, 1-76.

Unknown, Author, "Hotspot 2.0 (Release 1) Technical Specification", Wi-Fi Alliance® Technical Committee Hotspot 2.0 Technical Task Group, Version 1.0.0, 1-207.

\* cited by examiner

TERMINAL, NETWORK NODE AND METHODS THEREIN FOR ENABLING ACCESS TO A RADIO COMMUNICATIONS NETWORK

TECHNICAL FIELD

Embodiments herein relate to a terminal, a network node and methods therein for handling settings related to accessing a radio communications network.

BACKGROUND

In a typical radio communications network, terminals, also known as mobile stations, wireless devices and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g., eNodeBs in LTE, and the core network. As such, the radio access network (RAN) of an EPS system has an essentially "flat" architecture comprising radio base station nodes without reporting to RNCs.

As stated above, the Evolved UMTS Terrestrial Radio Access Network (E-UTRAN) comprises base stations called enhanced NodeBs (eNBs or eNodeBs), providing the E-UTRA user plane and control plane protocol terminations towards the User Equipment (UE). The eNBs are interconnected with each other by means of the X2 interface. The eNBs are also connected by means of the S1 interface to the EPC (Evolved Packet Core), more specifically to the Mobility Management Entity (MME) by means of the S1-MME interface and to the Serving Gateway (S-GW) by means of the S1-U interface. The S1 interface supports many-to-many relation between MMES/S-GWs and eNBs. The E-UTRAN architecture is illustrated in FIG. 1.

The eNB hosts functionalities such as Radio Resource Management (RRM), radio bearer control, admission control, header compression of user plane data towards serving gateway, routing of user plane data towards the serving gateway. The MME is the control node that processes the signaling between the UE and the CN. The main functions of the MME are related to connection management and bearer management, which are handled via Non Access Stratum (NAS) protocols. The S-GW is the anchor point for UE mobility, and also includes other functionalities such as temporary DL data buffering while the UE is being paged, packet routing and forwarding the right eNB, gathering of information for charging and lawful interception. The PDN Gateway (P-GW) is the node responsible for UE IP address allocation, as well as Quality of Service (QoS) enforcement (this is explained further in later sections). FIG. 2 gives a summary of the functionalities of the different nodes, and the reader is referred to 3GPP TS 36.300 V11.4.0 (2012-12) and the references therein for the details of the functionalities of the different nodes. In FIG. 2, the logical nodes comprise functional entities of the control plane and the radio protocol layers are marked with a frame.

Traffic Offloading Using Wi-Fi

Using Wi-Fi/WLAN, the two terms are used interchangeably throughout this disclosure, to offload traffic from the mobile networks is becoming more and more interesting from both the operator's and end users point of view. Some of the reasons for this tendency are:

Additional frequency: by using Wi-Fi, operators can get an additional 85 MHz in the 2.4 GHz band and another, close to, 500 MHz in the 5 GHz band.

Cost: From operator's point of view, Wi-Fi uses unlicensed frequency that is free of charge. On top of that, the cost of Wi-Fi Access Points (AP), both from Capital Expenditures (CAPEX) and Operating Expenditures (OPEX) deployment aspects, is considerably lower than that of a 3GPP base station, BS/eNB. Operators can also take advantage of already deployed APs that are already deployed in hotspots such as train stations, airports, stadiums, shopping malls, etc. Most end users are also currently used to having Wi-Fi for free at home, as home broadband subscriptions are usually flat rate, and public places.

Terminal support: Almost all User Equipments (UEs) such smartphones and other portable devices currently available in the market support Wi-Fi. In the Wi-Fi world, the term Station (STA) is used instead of UE, and as such the terms UE, STA and terminal are used interchangeably in this disclosure.

High data rate: Under low interference conditions and assuming the user equipment is close to the Wi-Fi AP, Wi-Fi can provide peak data rates that outshine that of current mobile networks, for example, theoretically up to 600 Mbps for IEEE 802.11n deployments with Multiple Input Multiple Output (MIMO).

A very simplified Wi-Fi architecture is illustrated in FIG. 3 and FIG. 4. On the user plane (FIG. 3), a very lean architecture is employed where the UE/STA is connected to the Wi-Fi Access Point (AP), which can directly be connected to the Internet. In the control plane (FIG. 4), an Access point Controller (AC) handles the management of the AP. One AC usually handles the management of several APs.

Security/authentication of users is handled via an Authentication, Authorization and Accounting (AAA) entity. Remote Administration Dial In User Service (RADIUS) is the most widely used network protocol for providing a centralized AAA management (RFC 2865).

Access Network Discovery and Selection Function

The Access Network Discovery and Selection Function (ANDFS) is an entity defined by 3GPP for providing access discovery information as well as mobility and routing settings to the UE. ANDFS is a new entity added to the 3GPP architecture in Release 8 of 3GPP TS 23.402. A simplified ANDSF architecture is depicted in FIG. 5. As shown in the FIG. 5, the ANDSF server is only connected to the UE and its main goal is to provide the UE with access network information in a resource efficient and secure manner. The communication between the UE and the ANDSF server is defined as an IP-based S14-interface.

By supplying information about available both 3GPP and non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of flexible and efficient UE steering of access mechanisms, where policy control can guide UEs to select one particular RAN over another. Note that this may be an overstatement if ANDSF is implemented as an "app", since it relies on OS support and priority of ANDSF in relation to other "apps". This condition may be only partly fulfilled, which makes the control somewhat unreliable.

The ANDSF supplies three types of information—discovery information, inter-system mobility settings (ISMP) and inter-system routing settings (ISRP). All these are summarized and implemented via ANDSF managed objects (MO), which are communicated to the UEs via an over-the-top (OTT) signaling channel, as Simple Object Access Protocol (SOAP)-XML messages.

The discovery information provides the UE with information regarding the availability of different Radio Access Technologies (RAT) in the UE's vicinity. This helps the UE to discover available (3GPP and) non-3GPP (Wi-Fi) access networks without the burden of continuous background scanning. Inter-System Mobility Settings (ISMP) are settings which guide the UE to select the most preferable 3GPP or non-3GPP access. The ISMP are used for UEs that access a single access (3GPP or Wi-Fi) at a time. The ISMP information specifies the behavior of UEs, which can be connected to only one access network at a given time (either 3GPP, WLAN, WiMAX, etc). If the UE, however, supports connection to several access networks at the same time, the operator can use the third type of information, ISRP, to increase the granularity of the RAN selection. In that case, the UEs will be provided with settings, which specify how the traffic flows should be distributed over the different RAN, for example, voice is only allowed to be carried over 3GPP RA, while Internet video streaming and best-effort traffic can be routed via WLAN. The ANDSF provides mobile operators with a tool to determine how the UEs connect to different RANs and hence allows them to add more flexibility in their traffic planning. Simplified examples of ANDSF rules are given in Table 1 and Table 2.

TABLE 1

ANDSF MO - Discovery Information

| AccessNetworkType | AccessNetworkArea | AccessNetworkInfoRef |
|---|---|---|
| 3 (WLAN) | Geo Location:<br>AnchorLatitude = 5536988<br>AnchorLongtitude = 836620<br>Radius = 40 | ID = 812<br>AddrType = SSID<br>Addr = OperatorSSID812<br>IP = <skipped><br>AuthInfo:<br>AuthType = HTTP-DIGEST<br>AuthName = Username<br>AuthSecret = Secret<br>BearerType = WLAN<br>BearerParam:<br>SecMode = 802.1X |
| 3 (WLAN) | 3GPP Location:<br>UTRAN_CI = 3048<br>UTRAN_CI = 4053 | ID = 1056<br>AddrType = SSID<br>Addr = OperatorSSID1056<br>IP = <skipped><br>AuthInfo:<br>AuthType = HTTP-DIGEST<br>AuthName = Username<br>AuthSecret = Secret<br>BearerType = WLAN<br>BearerParam:<br>SecMode = 802.1X |

Table 1 consists of two access network discovery entries. The first rule, for example, states that there is a WLAN access network (with SSID "OperatorSSID812") available in the area, described by the geographical coordinates. The second rule states that there is a WLAN access network available in two 3GPP cells, indicated by their respective cell IDs (CI).

TABLE 2

ANDSF MO - ISRP

| Rule Priority | ForFlowBased | Roaming | PLMN | Update-Policy |
|---|---|---|---|---|
| 1 | IPFlow:<br>StartSourcePortNumber = 22<br>EndSourcePortNumber = 23 (SSH, Telnet)<br>StartDestPortNumber = 22<br>EndDestPortNumber = 23<br>ValidityArea:<br>AnchorLatitude = 5536988<br>AnchorLongtitude = 836620<br>Radius = 40<br>RoutingRules:<br>AccessTechnology = 1 (3GPP) | 0 (UE not roaming) | 24009 | 0 (UE not required to update the policy) |
| 2 | IPFlow:<br>ProtocolType = 6 (TCP)<br>ValidityArea:<br>AnchorLatitude = 5536988<br>AnchorLongtitude = 836620<br>Radius = 40<br>TimeOfDay:<br>TimeStart = 170000<br>TimeStop = 180000<br>RoutingRules:<br>AccessTechnology = 3 (WLAN) | 0 (UE not roaming) | 24009 | 0 (UE not required to update the policy) |

TABLE 2-continued

ANDSF MO - ISRP

| Rule Priority | ForFlowBased | Roaming | PLMN | Update-Policy | |
|---|---|---|---|---|---|
| | AccessId = OperatorSSID812 | | | | 5 |

Table 2 contains description of two rules that apply to the same location (in this case represented by geographical coordinates). Note that the rules overlap, since the first one characterizes all data-flows carried via ports 20 to 23 (all of which usually carry TCP traffic). At the same time, the second rule applies to all Transmission Control Protocol (TCP) traffic, hence is more generic. In order to make sure that the Telnet and SSH traffic (ports 22 and 23 respectively) is carried over 3GPP RA, the first rule is given a higher priority, the lower number means higher priority.

Hotspot 2.0

Different standards organizations have started to recognize the needs for an enhanced user experience for Wi-Fi access, this process being driven by 3GPP operators. An example of this is the Wi-Fi Alliance with the Hot-Spot 2.0 (HS2.0) initiative, now officially called PassPoint ("Hotspot 2.0 (Release 1) Technical Specification", Wi-Fi Alliance® Technical Committee Hotspot 2.0 Technical Task Group, V 1.0.0). HS2.0 is primarily geared toward Wi-Fi networks. HS2.0 builds on IEEE 802.11u, and adds requirements on authentication mechanisms and auto-provisioning support.

The momentum of Hot-Spot 2.0 is due to its roaming support, its mandatory security requirements and for the level of control it provides over the terminal for network discovery and selection. Even if the current release of HS2.0 is not geared toward 3GPP interworking, 3GPP operators are trying to introduce additional traffic steering capabilities, leveraging HS2.0 802.11u mechanisms. Because of the high interest of 3GPP operators, there will be a second release of HS2.0 focusing on 3GPP interworking requirements.

HS2.0 contains the following procedures:
1. Discovery: where the terminal discovers the Wi-Fi network, and probes them for HS2.0 support, using 802.11u and HS 2.0 extensions.
2. Registration is performed by the terminal toward the Wi-Fi Hot-spot network if there is no valid subscription for that network.
3. Provisioning: Policy related to the created account is pushed toward the terminal. This only takes place when a registration takes place.
4. Access: cover the requirements and procedures to associate with a HS2.0 Wi-Fi network.

One of the attractive aspects of HS2.0 is it provides information for the STA that it can used to evaluate the load of the Wi-Fi network before attempting the authentication process, thereby avoid unnecessary connection to highly loaded Wi-Fi network. The load conditions that the STA can evaluate are the following:

BSS load element—This is actually a part of the original IEEE 802.11 standard and provides information about the AP population and the current over-the-air traffic levels, as shown in FIG. 6. It is obtained either via a Beacon or a Query Response frame and is used for vendor-specific AP-selection algorithms. The element is described in detail in Chapter 8.4.2.30 of IEEE 802.11. The most relevant field is the "Channel Utilization" field, which states the amount of time that the AP senses the medium as busy.

WAN metrics element—is one of the extra features that HotSpot™ 2.0 adds to the IEEE 802.11u amendment. The element, illustrated in FIG. 7, can be obtained via an Access Network Query Protocol (ANQP) query (by requesting the element "ANQP Vendor Specific list") and it provides information about the AP's uplink/downlink WAN (backhaul) speed, as well as the uplink/downlink load. The element is described in detail in Chapter 4.4 of the HS2.0 specification.

Current Behavior of Terminals Supporting 3GPP and Wi-Fi

Most current Wi-Fi deployments are totally separate from mobile networks, and are to be seen as non-integrated. From the terminal's perspective, most mobile operating systems (OS) for UEs such as Android and IOS, support a simple Wi-Fi offloading mechanism where the UEs immediately switch all their Packet Switched (PS) bearers to a Wi-Fi network upon a detection of such a network with a certain signal level. The decision to offload to a Wi-Fi or not is referred henceforth as access selection strategy and the aforementioned strategy of selecting Wi-Fi whenever such a network is detected is known as "Wi-H-if-coverage".

There are Several Drawbacks of the Wi-Fi-if-Coverage Strategy (Illustrated in FIG. 8):

Though the user/UE can save previous passcodes for already accessed Wi-Fi APs, hotspot login for previously unaccessed APs usually requires user intervention, either by entering the passcode in Wi-Fi connection manager or using a web interface.

Interruptions of ongoing services can occur due to the change of IP address when the UE switches to the Wi-Fi network. For example, a user who started a VoIP call while connected to a mobile network is likely to experience call drop when arriving home and the UE switching to the Wi-Fi network automatically. Though some applications are smart enough to handle this and survive the IP address change (e.g. Spotify), the majority of current applications don't. It also places a lot of burden on application developers if they have to ensure service continuity.

No consideration of expected radio performance is made, and this can lead to a UE being handed over from a high data rate mobile network link to a low data rate via the Wi-Fi link. Even though the UE's OS or some high level software is smart enough to make the offload decisions only when the signal level on the Wi-Fi is considerably better than the mobile network link, there can still be limitations on the backhaul that the Wi-Fi AP is using that may end up being the bottle neck.

No consideration of the load conditions in the mobile network and Wi-Fi are made. As such, the UE might still be offloaded to a Wi-Fi AP that is serving several UEs while the mobile network (e.g. LTE) that it was previously connected to is rather unloaded.

No consideration of the UE's mobility is made. Due to this, a fast moving UE can end up being offloaded to a Wi-Fi AP for a short duration, just to be handed over back to the mobile network. This is specially a problem in scenarios like cafes with open Wi-Fi, where a user walking by or even driving by the cafe might be affected by this. Such ping pong between the Wi-Fi and mobile network can cause service interruptions as well as generate considerable unnecessary signaling, e.g. towards authentication servers.

In order to combat these problems, several Wi-Fi/3GPP integration mechanisms have been proposed.

RAN Level Integration

A good level of integration of 3GPP and Wi-Fi can be realized via access selection based on RAN information on both 3GPP and Wi-Fi, in addition to the common authentication and user plane integration methods discussed above. This is illustrated in FIG. 9.

A functional entity known as a Smart RAN Controller (SRC) can be introduced that is used as an information sharing point for the Wi-Fi and 3GPP networks. Optimal traffic steering can then be performing by considering the situation at each network. Using such an abstraction, even legacy UEs could be able to benefit from Wi-Fi integration. For example, consider a legacy UE that is already connected to a 3GPP network, and employing "Wi-Fi if coverage" access selection mechanism comes to a Wi-Fi coverage area. When the UE tries to connect to the Wi-Fi network, the Wi-Fi AP/AC can connect to the SRC to request information about the current user's Quality of Service (QoS) in the 3GPP network, and if it is found that the user's QoS is going to be degraded if the connection is switched to Wi-Fi, a rejection could be sent to the UE from the Wi-Fi in order keep it connected to the 3GPP network. A tighter integration can also be formed if the Wi-Fi AP and eNB are co-located and have direct communication between them rather communicating via the SRC (similarly one can think of direct communication between the AC, RNC, BSS, etc. . . . ).

Policy Based WI-FI-3GPP Integration

ANDSF settings are either static or semi-static, and they're not adaptive to fast changing radio environments and system loads. Even though it is possible to enhance the ANDSF to include radio link quality into the settings, the current mechanism limits update frequency of the polices. Therefore it is not capable of guiding the terminal to an access which provides better quality of experience (QoE).

In terms of 3GPP interworking, HS2.0 is mainly to improve usability and facilitate access selection by providing the Wi-Fi loads. It is not expected that HS2.0 will support operator controlled dynamic access selection.

The ANDSF and HotSpot2.0 mechanisms described above are not targeting tight integration of Wi-Fi considering network information, e.g. load in different accesses, bitrates, etc. The reason for this is that the exact UE behaviour is not specified and the parameters do not include radio information. There is however work starting in 3GPP SA2 and Wi-Fi Alliance HotSpot2.0 Release 2 to enhance ANDSF to take into account the Hotspot 2.0 solutions. One example is that the ANDSF policy could define UE actions based on the information received from the Wi-Fi AP about the BSS load and WAN metric. FIG. 10 shows an example of the Integration of ANDSF and HS 2.0.

UE based solutions such as the currently available ones in Android and IOS based phones have several drawbacks as described above. Network based solutions such as ANDSF, as mentioned above, use rather static rules and they don't reflect current network conditions. RAN level integration via SRC is able to consider both UE and network performance in a dynamic fashion. However, the SRC based solution can become complex to realize as there is a need to maintain the context of each UE in the different access network. Also, each offloading decision requires the involvement of the SRC entity and a UE in IDLE mode in 3GPP and not connected to Wi-Fi will not be able to utilize the benefits of SRC based solutions.

A mechanisms for Wi-Fi-3GPP integration has been suggested that enables dynamic operator control over access selection and traffic steering between access networks by defining a number of semi-dynamic policy sets for each terminal. The dynamic network policy index can be broadcasted to all terminals or/and communicated in a unicast fashion to a given terminal to indicate a proper settings to use. A terminal selects one policy based on its current state, such as connection status and ongoing traffic.

Wi-Fi/3GPP Deployment Scenarios

The different deployment scenarios for Wi-Fi can be categorized into three groups as Private Wi-Fi, Public Wi-Fi and Integrated Wi-Fi. This is illustrated in FIG. 11 and the different scenarios are explained below:

Private Wi-Fi (Residential, Enterprise)
  Access selection controlled by end user
  Operator services supported over the top and/or with S2b (S2c)
  No charging
Public Wi-Fi (3rd Party, Operator/Shared Hotspot)
  Access selection depending on roaming agreements, end user, etc.
  Possible to use HS2.0 mechanism for authentication, e.g. Extensible Authentication Protocol-Subscribed Identity Module (EAP-SIM), and roaming
    Access selection based on operator settings (ANDSF/HS2.0) may be supported in the future terminals.
  Operator services supported over the top and/or with S2b (S2c)
  Different charging models typically used in Wi-Fi compared to cellular (e.g. flat-rate, bucket charging).
Integrated Wi-Fi (Wi-Fi as a Part of Heterogeneous Network)
  Wi-Fi network is managed by the operator.
  Access selection controlled by operator via network based mechanism and/or ANDSF/HS2.0 settings sent to the UE
  Seamless Wi-Fi offloading experience for end user (i.e. user does not need to care about which interfaces are used for the traffic)
  All operator services supported using smart service selection and user plane integration (e.g. S2a, S2b over trusted Wi-Fi)
  Possibility to optimize network performance and end user experience
  Future support for seamless IP session continuity
  Similar charging model in Wi-Fi and cellular.

For the Private and the Public Wi-Fi (Wi-Fi roaming) scenarios it is expected that only limited network control can be used due to e.g. different charging models typically used in Wi-Fi compared to cellular. Examples of network control mechanisms that could be also applicable in these scenarios are ANDSF and HS2.0. The performance of the radio communications network may be reduced when the terminal uses same settings related to accessing the radio communications network moving between cells in the radio communications network.

SUMMARY

An object of embodiments herein is to provide a mechanism improving the performance of the radio communications network.

According to an aspect the object is achieved by a method in a terminal for enabling access to a radio communications network. The terminal is served in a cell of the radio communications network. The terminal receives an indicator from a base station, which indicator indicates a set of settings to use in the cell, and the settings relate to access of the radio communications network.

According to another aspect the object is achieved by a method in a network node for enabling access for a terminal to a radio communications network. The terminal is served in a cell of the radio communications network. The network node transmits an indicator to the terminal, which indicator indicates a set of settings to use in the cell, and the settings relate to access of the radio communications network.

According to yet another aspect the object is achieved by a terminal for enabling access to a radio communications network. The terminal comprises a processing means configured to receive an indicator from a base station, which indicator indicates a set of settings to use in the cell, and the settings relate to access of the radio communications network.

According to still another aspect the object is achieved by a network node for enabling access for a terminal to a radio communications network. The terminal is served in a cell of the radio communications network. The network node comprises a processing means configured to transmit an indicator to the terminal, which indicator indicates a set of settings to use in the cell, and the settings relate to access of the radio communications network.

By receiving an indicator of set of settings to use in the cell the terminal uses an up to date set of setting in an efficient manner and thus avoids that the performance may be reduced when the terminal is using an outdated setting.

DETAILED DESCRIPTION

Figure 1:
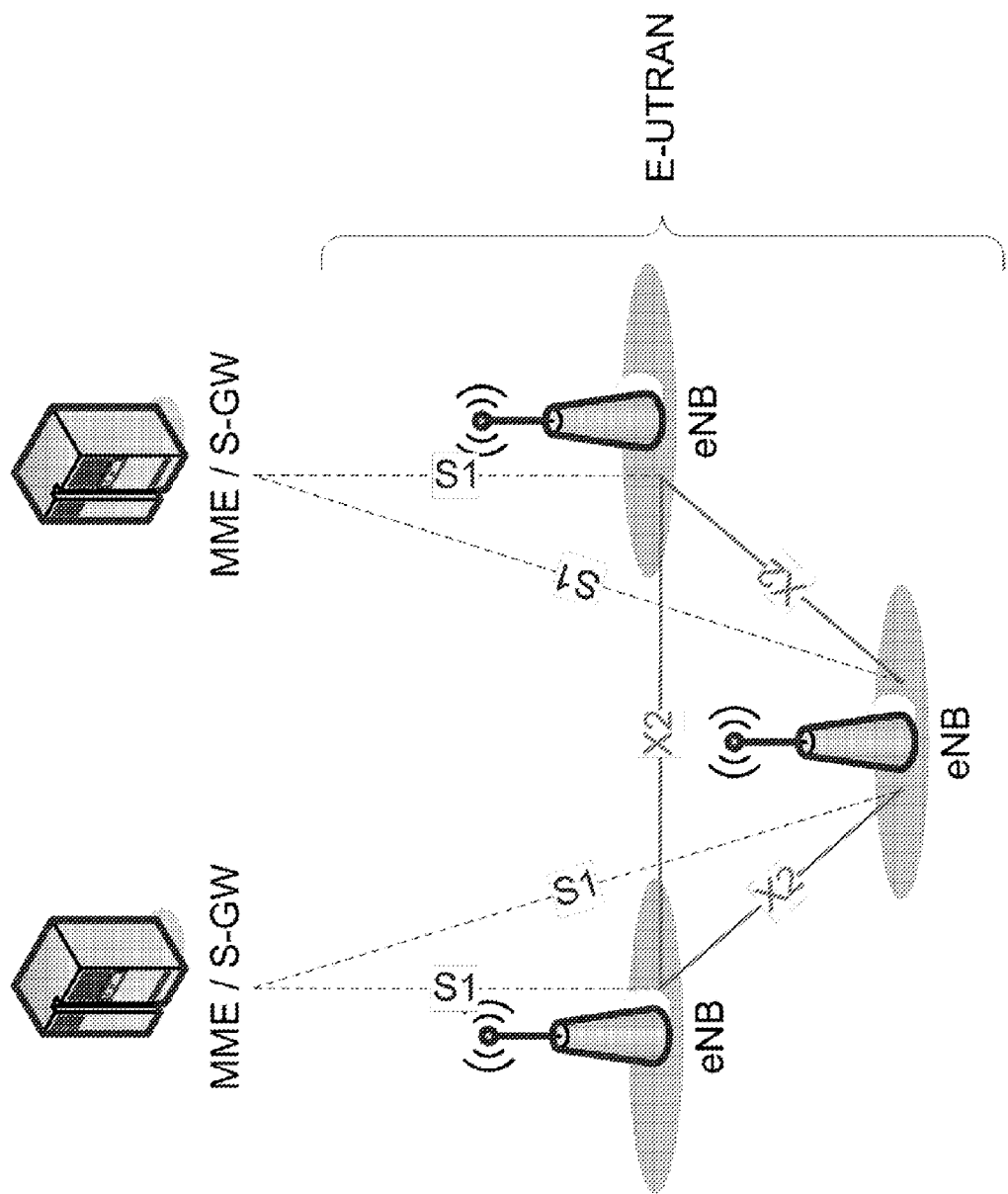
FIG. 1: Overall E-UTRAN Architecture.
Figure 2:
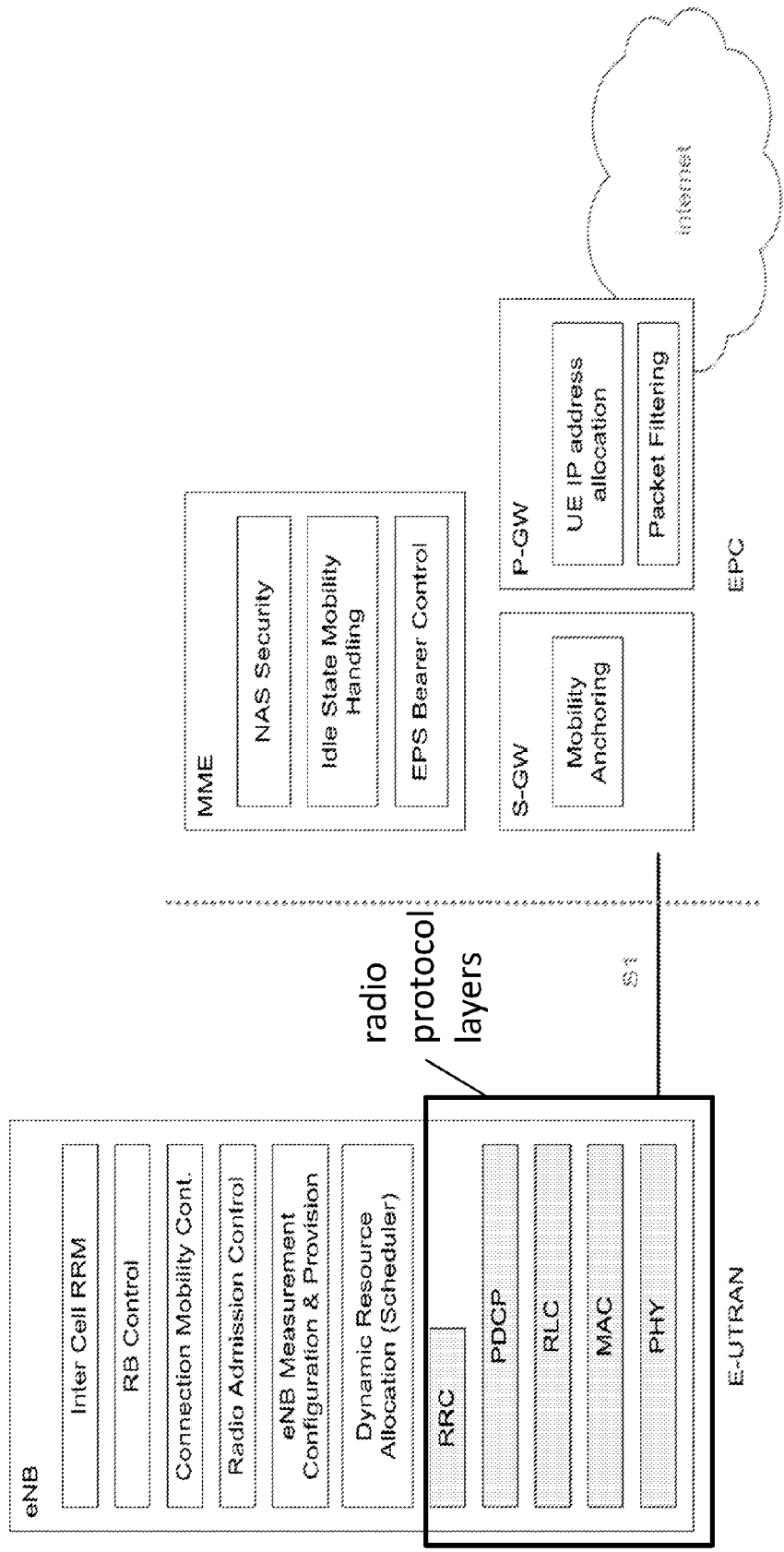
FIG. 2: Functional Split between E-UTRAN and EPC.
Figure 3:
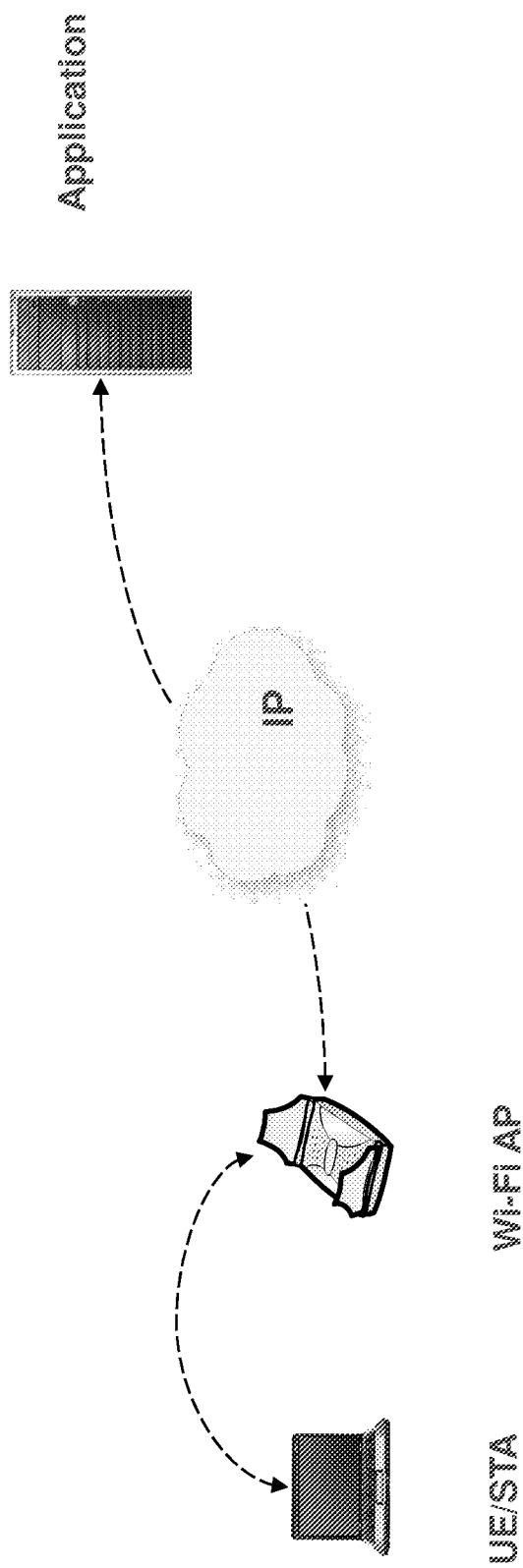
FIG. 3: Simplified Wi-Fi user plane architecture.
Figure 4:
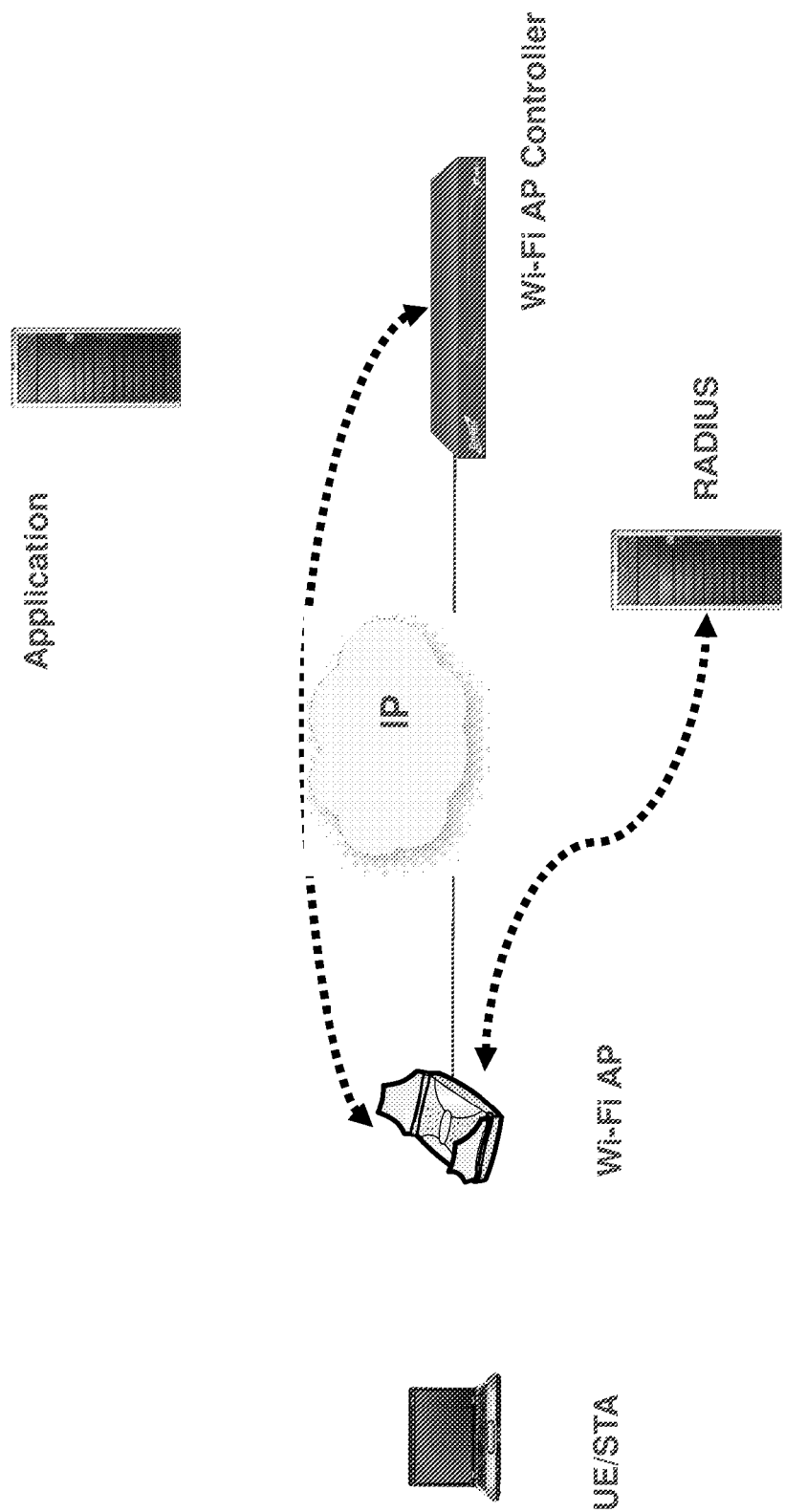
FIG. 4: Simplified Wi-Fi control plane architecture.
Figure 5:
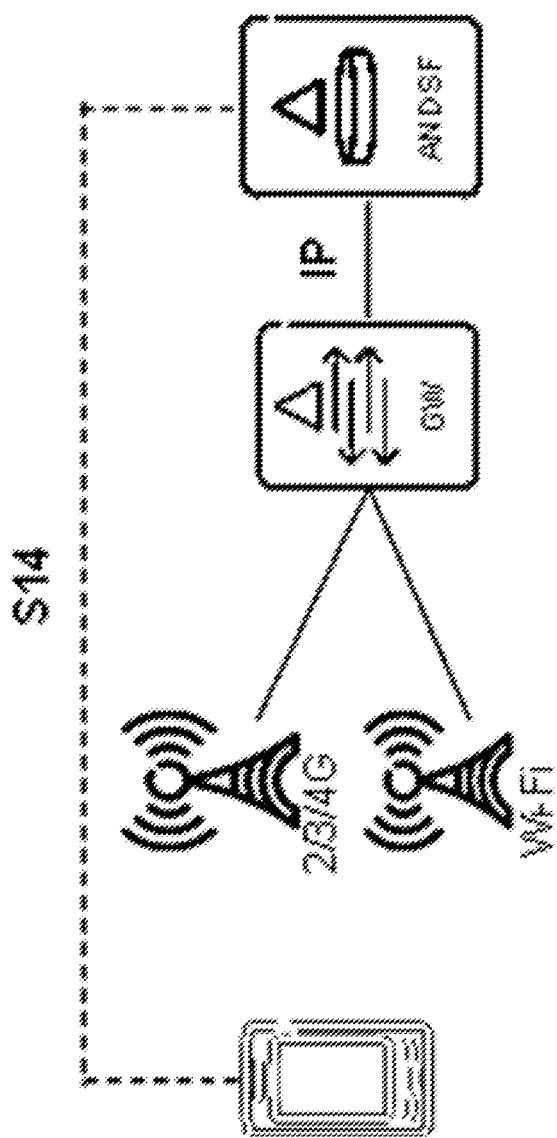
FIG. 5: Simplified ANDSF architecture.
Figure 6:
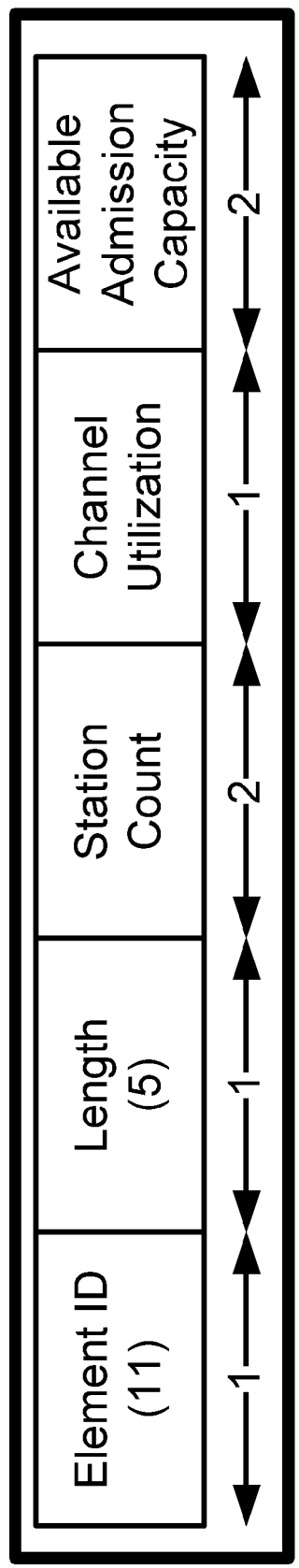
FIG. 6 BSS load element.
Figure 7:
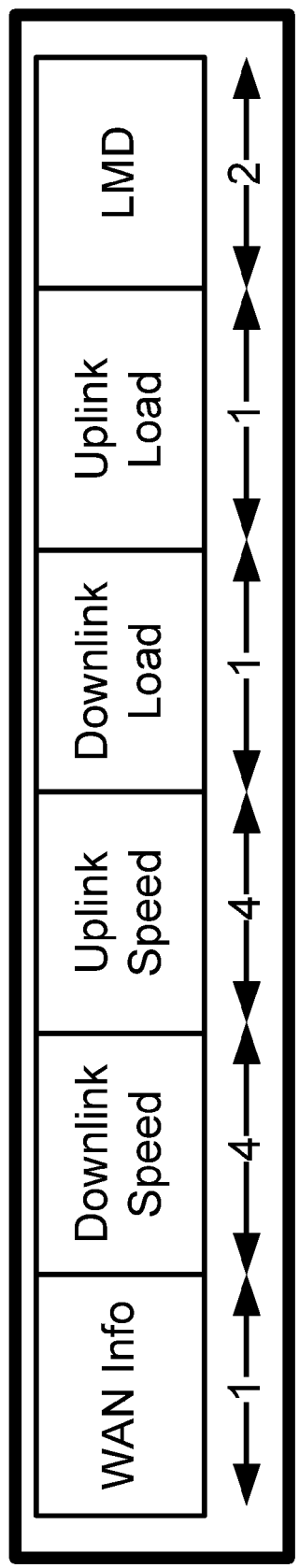
FIG. 7 WAN metrics element.
Figure 8:
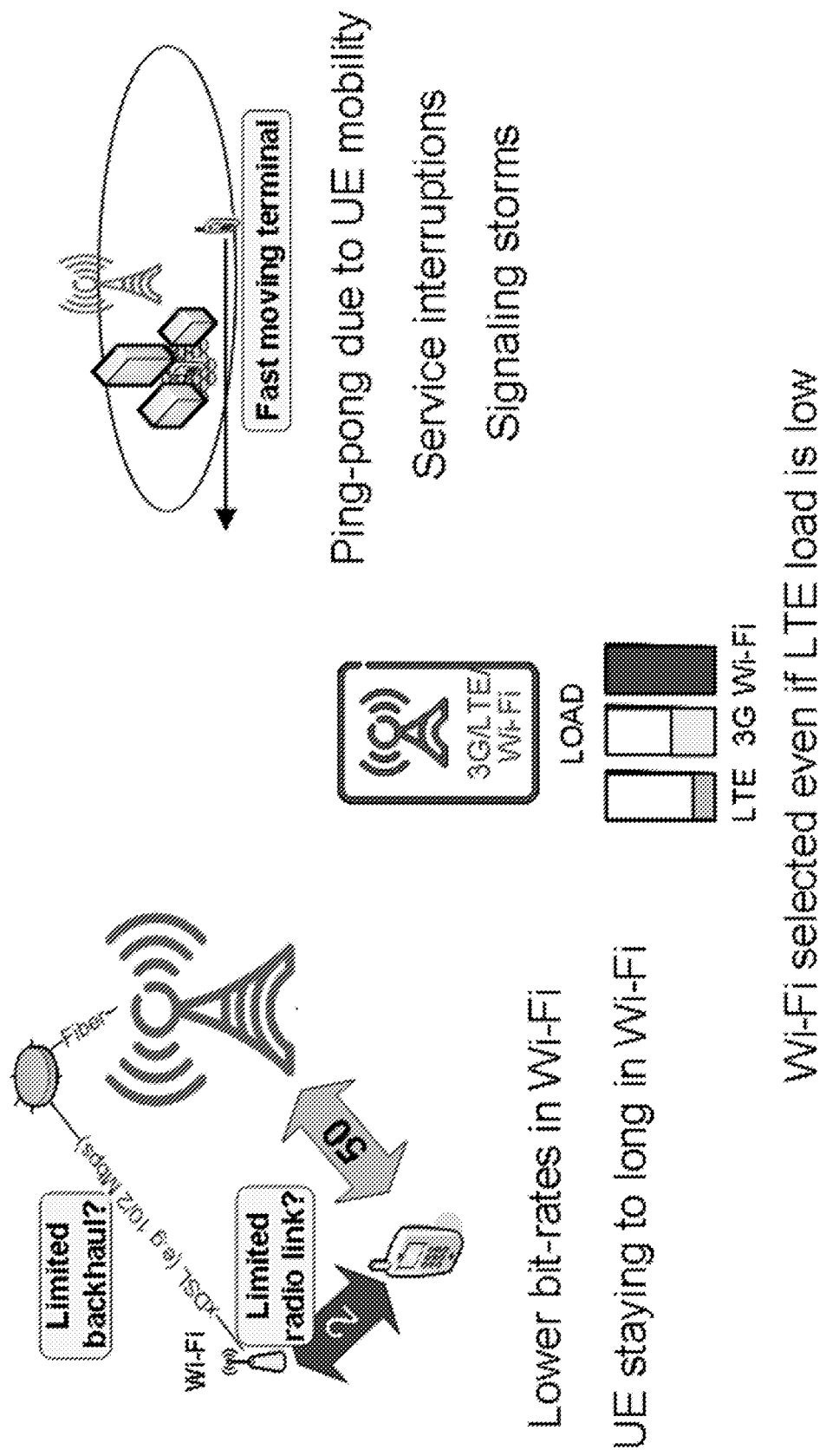
FIG. 8: Problems with "Wi-Fi-if-coverage" access selection.
Figure 9:
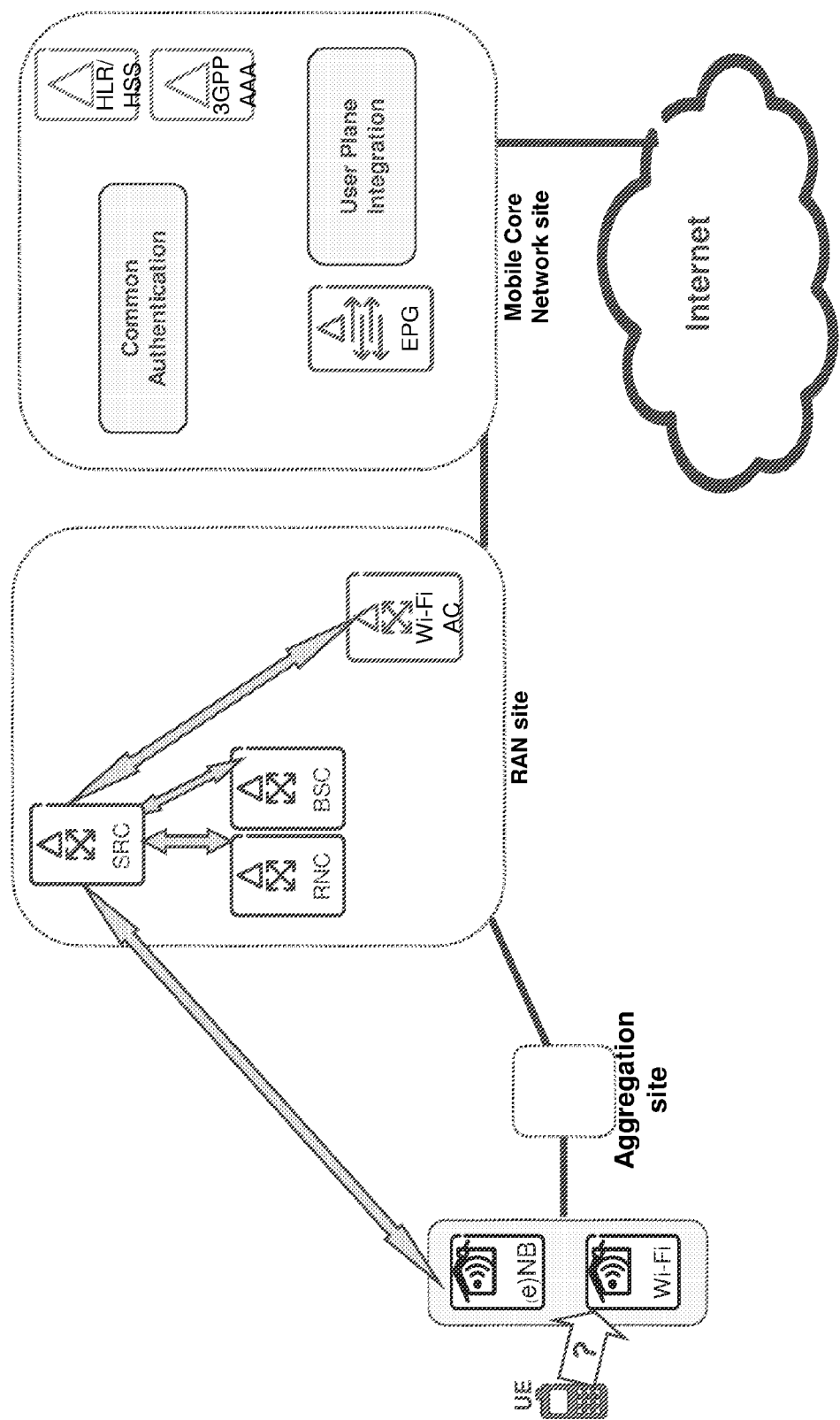
FIG. 9: RAN level integration.
Figure 10:
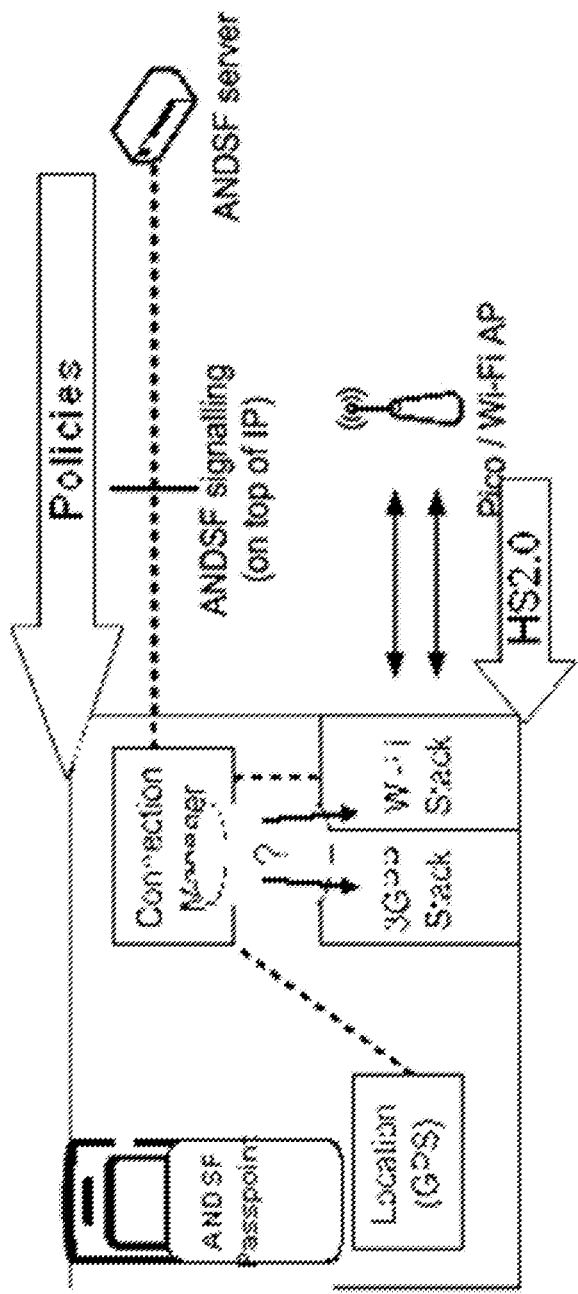
FIG. 10: Integration of ANDSF and HS 2.0.
Figure 11:
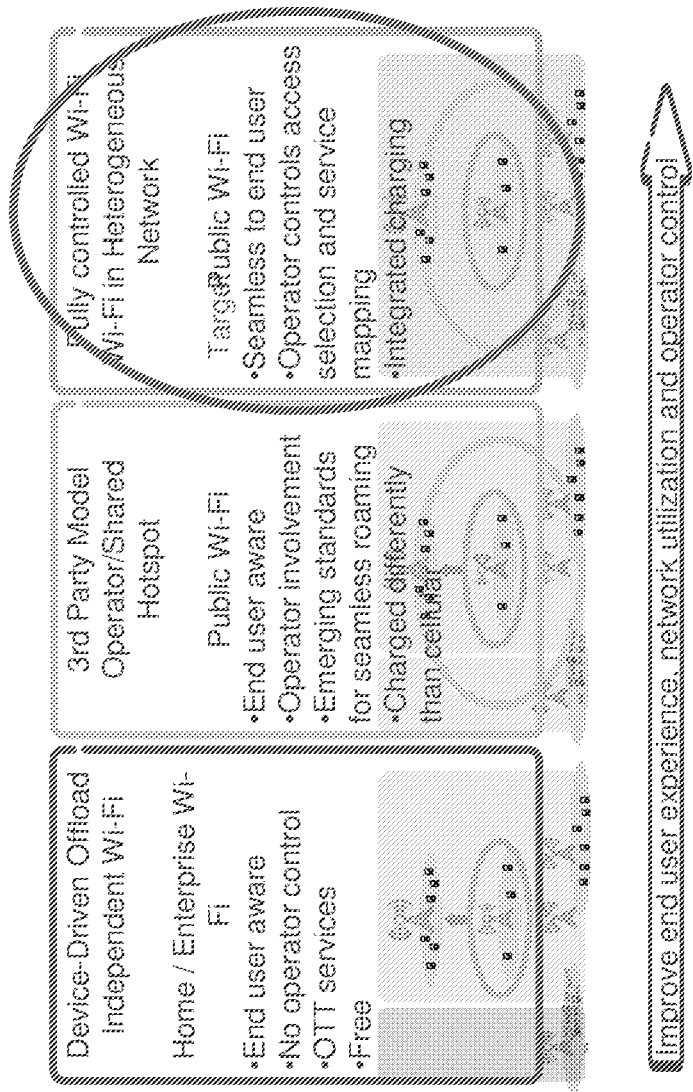
FIG. 11: Different Wi-Fi deployment scenarios.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments. In the below examples 3GPP networks and Wi-Fi networks has been used as examples. However, embodiments herein can apply to other types of networks as well.

Furthermore, in the disclosure policies are used as an example of settings but embodiments herein apply also to the case of other settings which the terminal needs to receive when being in CONNECTED mode but is applicable also to IDLE mode operation.

As part of developing embodiments a problem has first been identified. Consider a scenario where a policy based solution is utilized for Wi-Fi-3GPP integration and a terminal has received a set of settings, such as policies, while in connected mode and then goes to IDLE mode. For purposes of illustration and explanation only, these and other embodiments of the present invention are described herein in the context of operating in a radio access network (RAN) that communicates over radio communication channels with terminals (also referred to as user equipment, or "UEs"). More particularly, specific embodiments are described in the context of systems using Long Term Evolution (LTE) technology, as standardized by the membership of the 3rd Generation Partnership Project (3GPP). It will be understood, however, that the present invention is not limited to such embodiments and may be embodied generally in various types of communication networks.

Also note that the use of terminology such as "base station" (which may be referred to in various contexts as NodeB, for example) and "terminal," "mobile terminal," or "wireless device" (often referred to as "UE" or "User Equipment") should be considering non-limiting and does not necessarily imply a certain hierarchical relation between two particular nodes of a communication link. In general, a base station (e.g., a "NodeB") and a terminal (e.g., a "UE") may be considered as examples of respective different communications devices that communicate with each other over a wireless radio channel. While embodiments discussed herein may focus on wireless transmissions in a downlink from a NodeB to a UE, the techniques may also be applied, for example, to uplink transmissions in some contexts. As a result, several embodiments described in detail below may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the inventive techniques disclosed herein. Because these details are not necessary to a complete understanding of the present invention, those details are generally omitted in the following discussion and in the accompanying figures.

If the network changes the settings e.g. policies while the terminal is in IDLE mode, then the terminal will not be aware of it. This can cause problems because the terminal might end up using outdated policies as what is broadcasted from the network is the policy index, and not the whole policy set. It might even lead to erroneous behavior if the new set of policies doesn't have the same number of policy sets. For example, if an old policy set contains three policies (indexes 1 to 3), and the new one has four (indexes 1 to 4), and the network broadcasts policy index 4 to be used, then the terminal in IDLE mode that is only aware of the old policies will not be able to handle the situation. The problem can also arise to the same extent in CONNECTED mode, but it is less easy to deal with as the network can push the new policies to the connected terminals immediately after a policy change.

A policy setting change or setting change is not only a time dependent issue and it can also be location dependent. That is, it is quite possible that an operator can configure different neighboring cells with different sets. For example, one cell can have few Wi-Fi APs and another one several APs, or one cell is located on the city center where users are expected to drive slowly or even walk, while another one is located on the highway where terminals will be experiencing high speed mobility. Thus, it is also important to let a terminal know when a set in a new cell that is now camping on (in IDLE mode) or is handed over to (in CONNECTED mode) is different from the previous cell that the terminal was camping on or connected to, respectively.

In embodiments disclosed herein, solutions are provided to notify terminals of setting changes, e.g. policy changes, and thus avoid unwanted and/or erroneous behavior which might have led to performance degradation of the UE or the overall network. Embodiments herein avoid a terminal to use outdated set of settings when moving around in a wireless network when being IDLE.

The object may be achieved by a method in a network node such as a base station in a communications network, wherein the network node broadcasts or transmits an indicator indicating a settings on e.g. a broadcast channel. The indicator may further indicate an update of the set is to be performed. The indicator may be referred to herein as a set indicator or setting indicator and the set of settings may be referred to herein as set or setting set.

The object may be achieved by a method in a terminal served by a network node in a radio communications network. The terminal, in idle or connected mode, receives, from the network node, an indicator indicating a set of settings on e.g. a broadcast channel. The terminal may then connect to the network node or a different node requesting a present set of settings.

Embodiments herein enable that a terminal will know when a setting, which it maintains is out-of-date and needs updating by having the network broadcast an indicator corresponding to the set of setting, which the terminal is receiving. If the terminal identifies that the received set of setting has a different indicator than the one which is received the terminal will consider the current setting that it is using as out-of-date and will request, or in other way ensure that it will receive, an up-to-date set of setting.

In this document it will be discussed that the terminal is maintaining a set of polices however the methods discussed herein apply also to the special case when the set contains only one policy. It should be understood by the skilled in the art that "terminal" is a non-limiting term which means any user equipment, station, wireless terminal, device or node e.g. Personal Digital Assistant (PDA), laptop, mobile, sensor, relay, mobile tablets or even a small base station communicating within respective cell.

The term base station may also be referred to as e.g. a NodeB, an evolved Node B (eNB, eNode B), a base transceiver station, Access Point Base Station, base station router, radio base station, access point or any other network unit capable to communicate with a user equipment depending e.g. of the radio access technology and terminology used.

The term network may also be referred to as network node, radio network node or similar.

It should be noted that the policy set indicator which is described herein is an example of an indicator of a set of settings, and is an indicator sent to the terminals in a cell indicating to the terminals which policy set should be used within the cell. The network node may also signal a policy index, this policy index is an indicator which indicates to the terminal which policy within a policy set should be used. One cell may use a policy set X including policies A, B and C which are indexed 1, 2 and 3. If it is signaled policy index 2 in this cell, the terminals would use policy B. Another cell may use another policy set Y including policies D, E and E also indexed 1, 2 and 3. If it is signaled policy index 2 in this cell, the terminals would use policy E. An idea of embodiments herein is that if a terminal initially is in the first cell and therefore using policy set X (including policies A, B and C), if the terminal moves to the second cell it should not use policy set X any longer, but instead should use policy set Y so that the terminal would not follow the wrong policy. The methods described herein enable that the terminal will notice that it should no longer use policy set X when entering the second cell.

Figure 12:
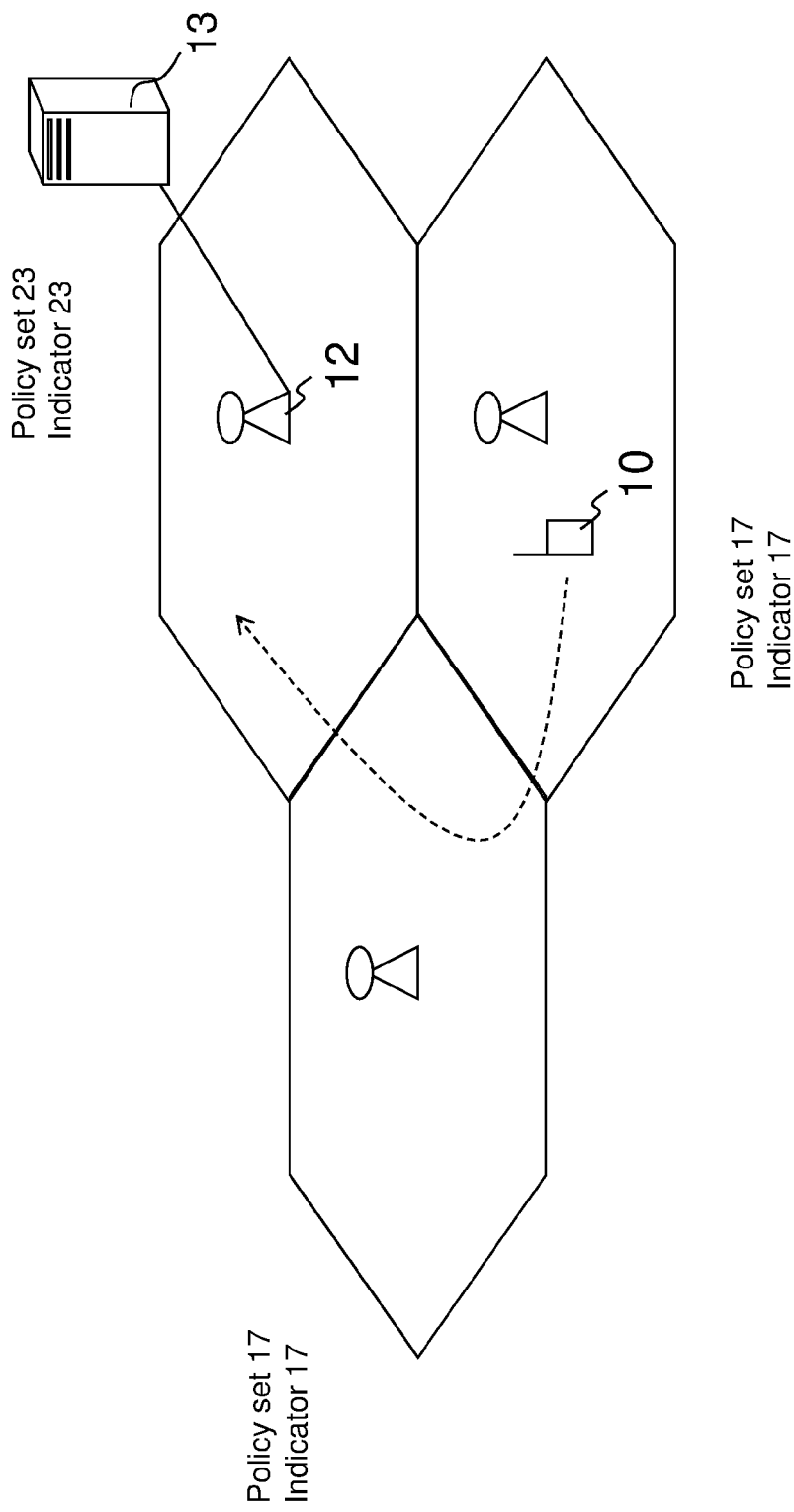
FIG. 12: Example scenario illustrating multiple embodiments described herein.

Some aspects of the embodiments disclosed herein are illustrated by the example shown in FIG. 12, wherein the set of settings relates to set of policies. A terminal 10 is moving through three cells, the starting cell uses a policy set 17, an indicator is set to 17. The terminal 10 will move to another cell which also uses policy set 17 hence the policy indicator is also set to 17 in this other cell. As the policy set indicator for the second cell is the same as for the first cell the terminal 10 knows that the policy set does not need updated. Later the terminal 10 enters a third cell which use a policy set 23 with a policy set indicator 23. The terminal 10 will when discovering that the policy indicator '23' is different from the indicator of the policy set it currently maintains '17', then request the network, e.g. a base station 12 or another network node, such as an ANDSF 13, via the base station 12, to get new policies. Note that, the same thing is applicable even if the terminal 10 is staying within the same cell, but notices that the policy set has changed.

In the below sections, methods enabling this behavior are explained.

Methods in the Radio Communications Network Such as the Base Station 12 when Set of Settings is Exemplified as a Set of Policies The base station 12 broadcasts, or transmits over a dedicated channel, in a cell a policy set indicator associated with a policy set which it transmits to terminals in the cell. This indicator may be broadcasted, for example in a System Information Block (SIB). The benefit of broadcasting this indicator is that also the terminal 10 which is IDLE mode will read the broadcast channel and hence also receive the indicator. This becomes important for example when the IDLE mode terminal 10 moves between cells in a system as it will be able to receive the indicator in the different cells without establishing a connection to these cells.

Figure 13:
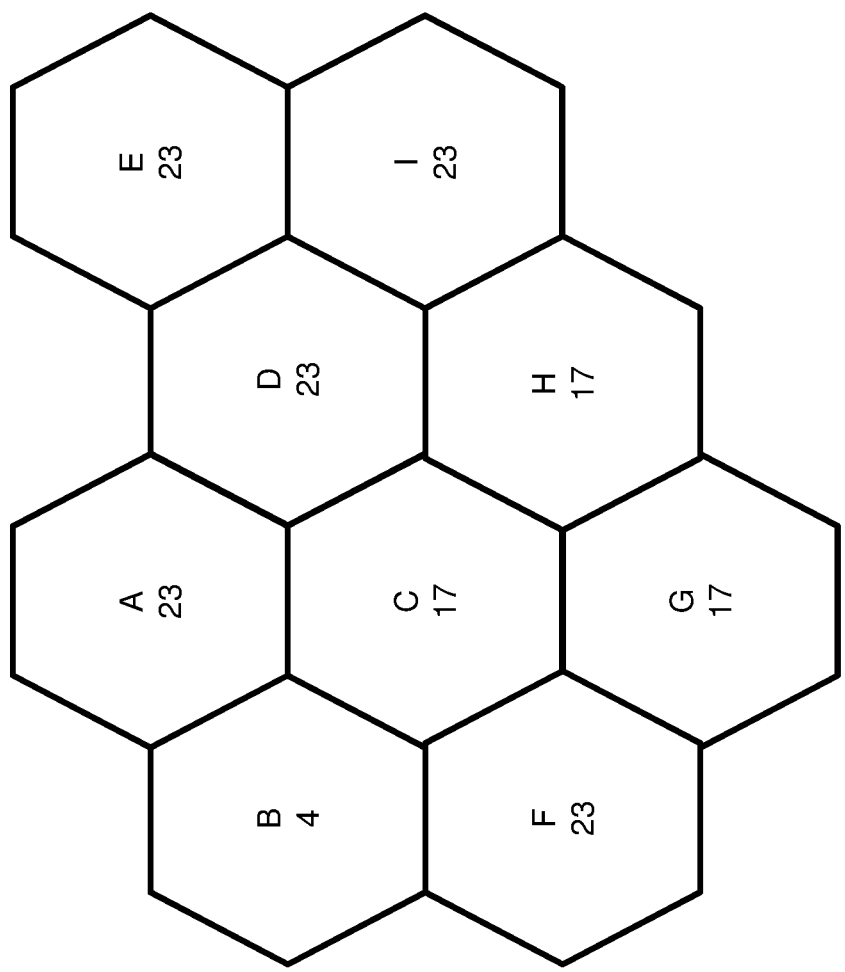
FIG. 13: Example of policy coordination between cells.

In one embodiment a network node, such as a coordinating node, a controlling node, an MME a SGW or similar, coordinates the sets of settings and indicators e.g. policy sets and policy set indicators, between different base stations, or cells. If two cells should use the same e.g. policy set they are also broadcasting the same policy set indicator. An example is seen in FIG. 13 where cell A, D, E, F and I use policy set 23 and hence will be signaling policy set 23 to its terminals and broadcast policy set indicator 23. Cell C, G and H use policy set 17 and hence will be signaling policy set 17 to its terminals and broadcast policy set indicator 17. Cell B uses policy set 4 and hence will be signaling policy set 4 to its terminals and broadcast policy set indicator 4.

The appropriate set of settings for the terminals to use in a certain cell can depend on the characteristics of the cell and the area which the cell serves. Examples of these characteristics include:

Number of Wi-Fi nodes—The number of Wi-Fi nodes is expected to impact the characteristics of the set. If one cell covers an area with many Wi-Fi nodes it may be appropriate that many terminals connect to Wi-Fi as the number of terminals per Wi-Fi node will be low. This could be achieved by having e.g. a policy mandating that terminals should connect to Wi-Fi as long as the Wi-Fi signal strength is acceptable. Another cell is covering an area with few Wi-Fi nodes and it may therefore be appropriate that fewer terminals connect to Wi-Fi as the risk of Wi-Fi overload is higher, the policy may then only offload terminals to Wi-Fi in case their Wi-Fi received signal strength is high.

Distribution of Wi-Fi nodes—If the Wi-Fi node location is well planned or not can relate to the wanted terminal behavior. For example if the Wi-Fi nodes are placed in areas with high traffic densities, so called hot spots/hot zones, it may be a high risk of Wi-Fi overload and the policy, setting, may be so that terminals should connect to Wi-Fi only when the 3GPP load is high. Instead if the Wi-Fi nodes are placed in areas with moderate traffic densities there is a low risk of Wi-Fi overload and hence the policy set may be designed so that terminals connect to the Wi-Fi access point also at low 3GPP load.

User or Terminal behavior—The traffic generated by the terminals in an area can change the wanted policy set. For example an area where the terminals are generating a lot of traffic it is more important that the terminals are connecting to Wi-Fi so as to offload the 3GPP network compared to an area where the terminals are generating little traffic. Another example is the configuration of different settings in low mobility areas such as pedestrian streets as compared to a high mobility area such as highways.

Base station capability—Different base stations may have very different behavior and performance, for example the need for Wi-Fi offloading is not as high for a high performing base station as for a low performing base station. This may be reflected in the settings, where the settings of the high performing base station is more restrictive in moving terminals to Wi-Fi while the low performing base station may to a higher degree promote terminals to connect to Wi-Fi.

In one embodiment the policy set in one cell is updated depending on the state of the cell. For example the load of the wireless networks may fluctuate over the course of a day and one policy set may be appropriate in the morning while another policy set is appropriate in the evening. Different settings may then be transmitted in the morning and in the evening and the network would change the policy and change which policy set indicator it broadcasts in the cells.

Figure 14:
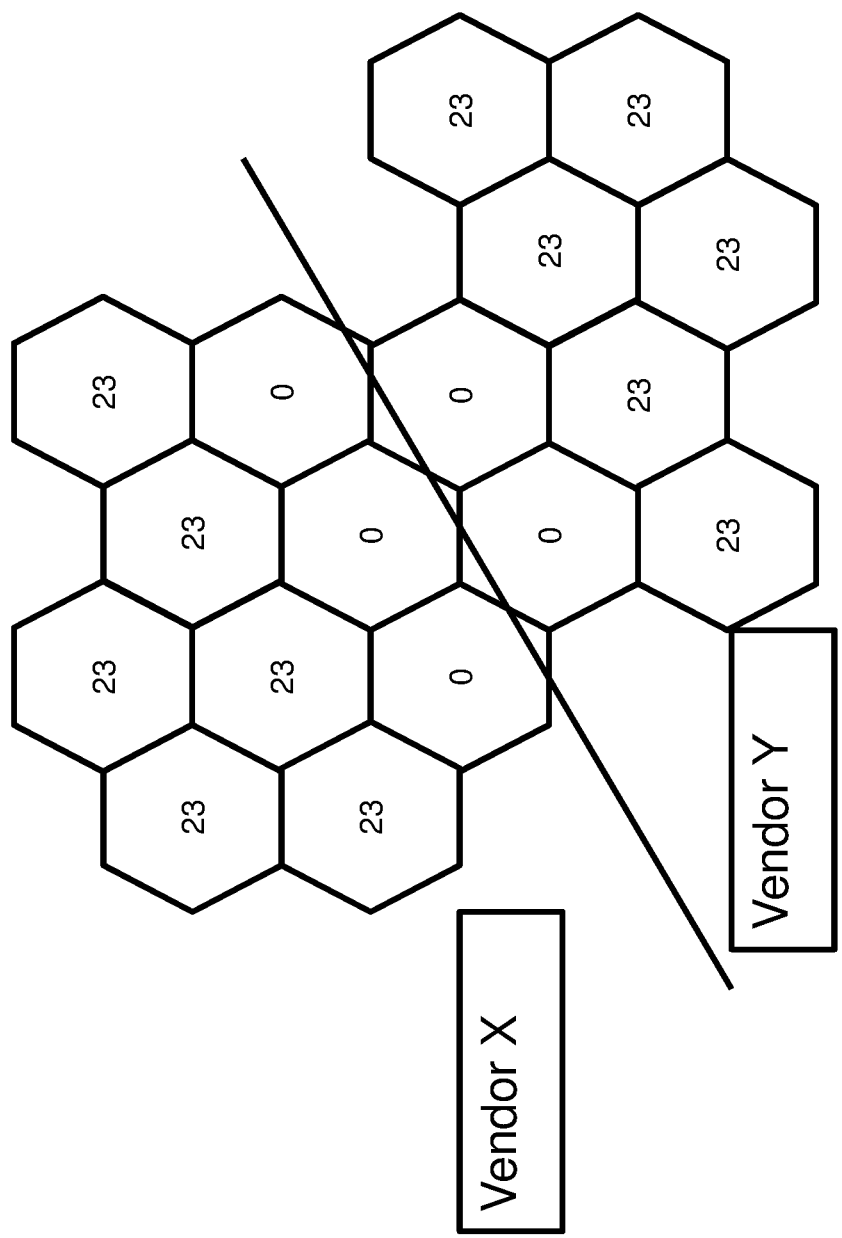
FIG. 14: Multi vendor scenario with special indicators on the border.

There may be a special policy indicator which indicates to the terminal 10 that upon entering the cell it shall update the policy set regardless of the stored policy set or policy set indicator. If this special policy indicator for example is 0 the terminal 10 moving from one cell to another both indicating value 0 the terminal 10 will consider the policy out-of-date even though both cells had the same indicator (i.e. 0). This feature is for example beneficial in a multi vendor scenario where one area is served by network nodes from one network vendor and an adjacent area is served by network nodes from another network vendor. There may not be any coordination between such networks and policy 23 from vendor X's nodes may not correspond to policy 23 from vendor Y's nodes. In FIG. 14 such a scenario is shown. In the top of the figure, cells from vendor X are seen and in the bottom of the figure cells from vendor Y are seen. The terminal 10 moving from the top of the figure to the bottom of the figure will avoid using policy 23 from vendor X when moving in to a vendor Y cell since on the border between these areas the cells use the special indicator (i.e. 0). When the terminal 10 enters the cells with indicator 0 it will consider its policy set as out-of-date.

Methods in the Terminal 10 when Set of Settings is Exemplified as a Set of Policies The terminal 10 receives a policy set and a corresponding policy set indicator from the base station 12 and stores this policy set as well as the policy set indicator. This may only be done when the terminal 10 is in CONNECTED mode. For example, if the terminal 10 is in a cell A where the policy set 17 is used and the policy set indicator value 17 has been indicated. The terminal 10 then maintains the policy set 17 and remembers the policy set indicator value 17. Policy set 17 will then be identified by identity 17. The terminal 10 monitors the policy set indicator of the current cell and identifies if it differs from the policy set indicator which the terminal 10 has stored. This may only be done in IDLE mode, or may be done in both IDLE mode and CONNECTED mode. If the policy set indicator received by the cell on which the terminal 10 is camping on differs from the policy set indicator which the terminal 10 has stored, the terminal 10 will consider the stored policy set out-of-date. The terminal 10 may then need to get an updated policy set.

When the terminal 10 has identified that it needs to get an updated policy set, it may indicate this to the network, e.g to the ANDSF 13. The terminal 10 may first need to complete a Radio Resource Control (RRC) connection reestablishment procedure. One alternative is that the terminal 10 indicates in a message during the RRC connection reestablishment procedure that it needs to get updated polices. In another alternative the terminal 10 will indicate in a message sent after completion of RRC connection reestablishment that its policy set needs to be updated. The base station 12 or the ANDSF 13 will then send the policy set to the terminal 10.

If the terminal 10 is in CONNECTED mode when it notices that the policy set has changed, it can request the new policy from the base station 12 via dedicated update request to the base station 12.

Between the time when the terminal 10 has considered the stored settings out-of-date until the terminal 10 has received and applied the updated settings the terminal 10 may apply a default behavior or policy or policy set. This default behavior could for example be to refrain from connecting to Wi-Fi regardless of what the out-of-date policy set indicates. This may be necessary when the out-of-date policy set indicates that the terminal 10 shall refrain from accessing the 3GPP network, as it would then make it impossible to get updated settings from the 3GPP network.

The terminal 10 may save the out-of-date settings together with the corresponding policy set indicator for later use. If the terminal 10 would for example move from a cell where policy set indicator is 17 to a cell where the policy set indicator is 23 and thereby consider policy set 17 out-of-date, the terminal 10 would then save policy set 17 for later use. If the terminal 10 at a later stage returns to the cell (or another cell with policy index 17, or that the new cell changes from using policy 23 to using policy 17) with policy set 17 it does not need to receive policy set 17 from the base station 12 or the ANDSF 13. In another embodiment the terminal 10 discards the maintained, out-of-date, policy set. In a system where different policy sets has the same policy set indicator it may be necessary that the terminal 10 discards the policy set when it becomes out-of-date to avoid policy set confusion. Policy set confusion in this case is that the terminal 10 has received a policy set with indicator X in one cell and the moves to another cell where policy set indicator X is used but the policy is not the same as in the first cell.

In one embodiment the terminal 10 is configured so that it will consider the maintained policy set out-of-date only when the difference between the maintained policy set indicator and the current cells broadcasted policy set indicator is larger than a value N. The value N may be predefined in the terminal 10, for example specified in a specification, or indicated by the network. The benefit of this embodiment is that in case policy set X and policy set Y are similar it may be acceptable that the terminal 10 is using policy set X when policy set Y is used, their policy set index can then be set to have a small difference, e.g. 24 and 25. If the value N is set to 3 and the terminal 10 is currently maintaining a policy set with corresponding indicator X the terminal 10 will consider the current policy set out-of-date only when receiving an indicator with value X±3.

With the methods in the disclosed embodiments the number of policy set updates are reduced. This is especially beneficial for terminals which are in IDLE mode. It is expected that the terminal 10 needs to be in CONNECTED mode to be able to get updated polices. With prior art there is no way to have different policy sets in different cells.

Embodiments disclosed herein not only enable per-cell settings but it also allows reduced the number of policy updates which both reduced the amount of signaling load due to policy updates as well as the number of connections needed to be performed by the terminal 10.

Figure 15:
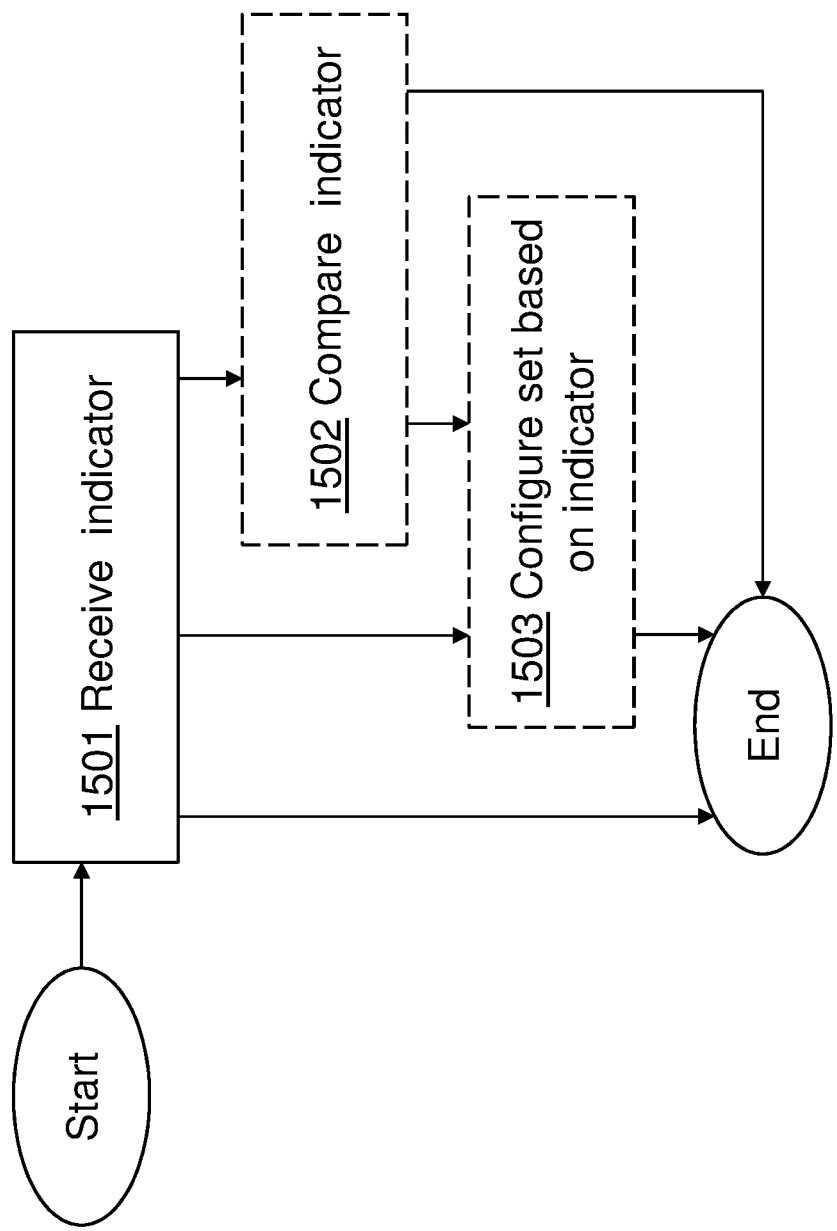
FIG. 15: Method in a terminal.

FIG. 15 discloses a schematic flowchart depicting a method in the terminal 10.

The terminal may receive a policy set and a corresponding policy set indicator from the base station 12 and may store this policy set as well as the policy set indicator.

Action 1501. The terminal 10 receives a broadcasted indicator from a base station 12. The indicator indicates set of settings, such as policies, to use in a cell of the base station. The policy is related to access of networks of different technologies, e.g. when to access a radio cell and when to access a Wi-Fi cell. The terminal 10 may receive the indicator in Idle mode.

Action 1502. The terminal 10 may compare set indicated by the received indicator with a stored or presently used set.

Action 1503. The terminal may configure or use the set indicated by the received indicator e.g. when being different than the presently used set. The terminal may in connected mode retrieve the set from a network node such as the base station 12, an ANDSF 13 or other network node.

Figure 16:
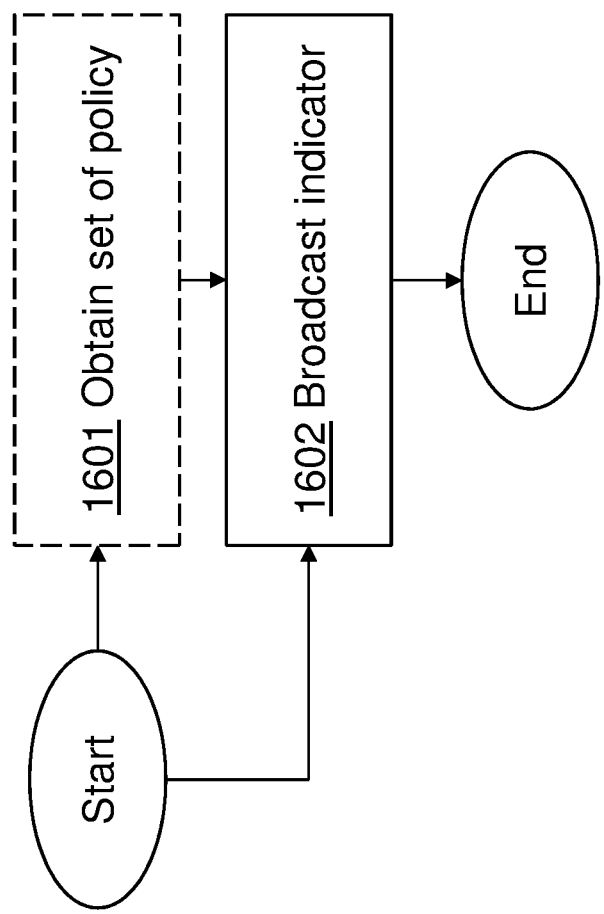
FIG. 16: Method in a network node.

FIG. 16 discloses a schematic flowchart depicting a method in the network node such as the base station 12.

Action 1601. The network node obtains the set of settings to use in a cell of the network node. The network node may receive, e.g be configured, or determine the set of settings.

Action 1602. The network node may broadcast an indicator indicating set of settings to be used in the cell of the network node by terminals.

Figure 17:
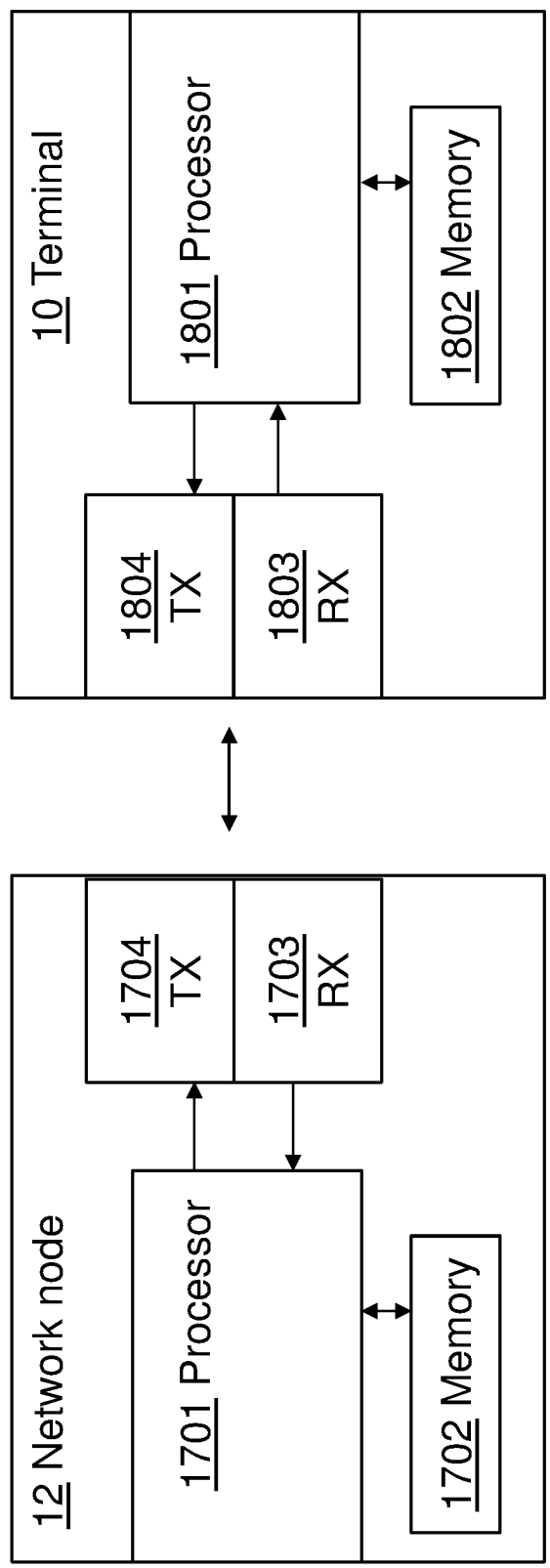
FIG. 17: Block diagram depicting a terminal and a network node.

FIG. 17 illustrates schematically where the terminal 10 is adapted to perform methods according to embodiments herein, but also wherein the network node 12 is adapted to perform the methods described herein. The terminal 10 is adapted for handling policy information in a radio communications network. The policy information is related to access information for a radio communications network, such as LTE or UMTS, and a non-operator controlled wireless network, such as a Wi-Fi network.

The terminal 10 comprises a processor 1701 and the network node comprises a processor 1801. The method actions performed by the terminal 10 are performed by functional elements of the processor 1701. The method actions performed by the network node 12 are performed by functional elements of the processor 1801.

In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband processing circuitry for mobile devices and wireless base stations are well known and are unnecessary to a full understanding of embodiments herein, additional details are not shown here. Program code is stored in a memory 1702,1802, respectively, that may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the actions of these techniques are necessarily performed in a single microprocessor or even in a single module. The terminal 10 and radio base station 12 further comprise respectively a communication interface, comprising a receiver 1703,1803 and a transmitter 1704, 1804, for communicating with the each other.

The present embodiments herein may, of course, be carried out in other ways than those specifically set forth herein without departing from essential characteristics of the embodiments. The present embodiments are to be considered in all respects as illustrative and not restrictive.

Figure 18:
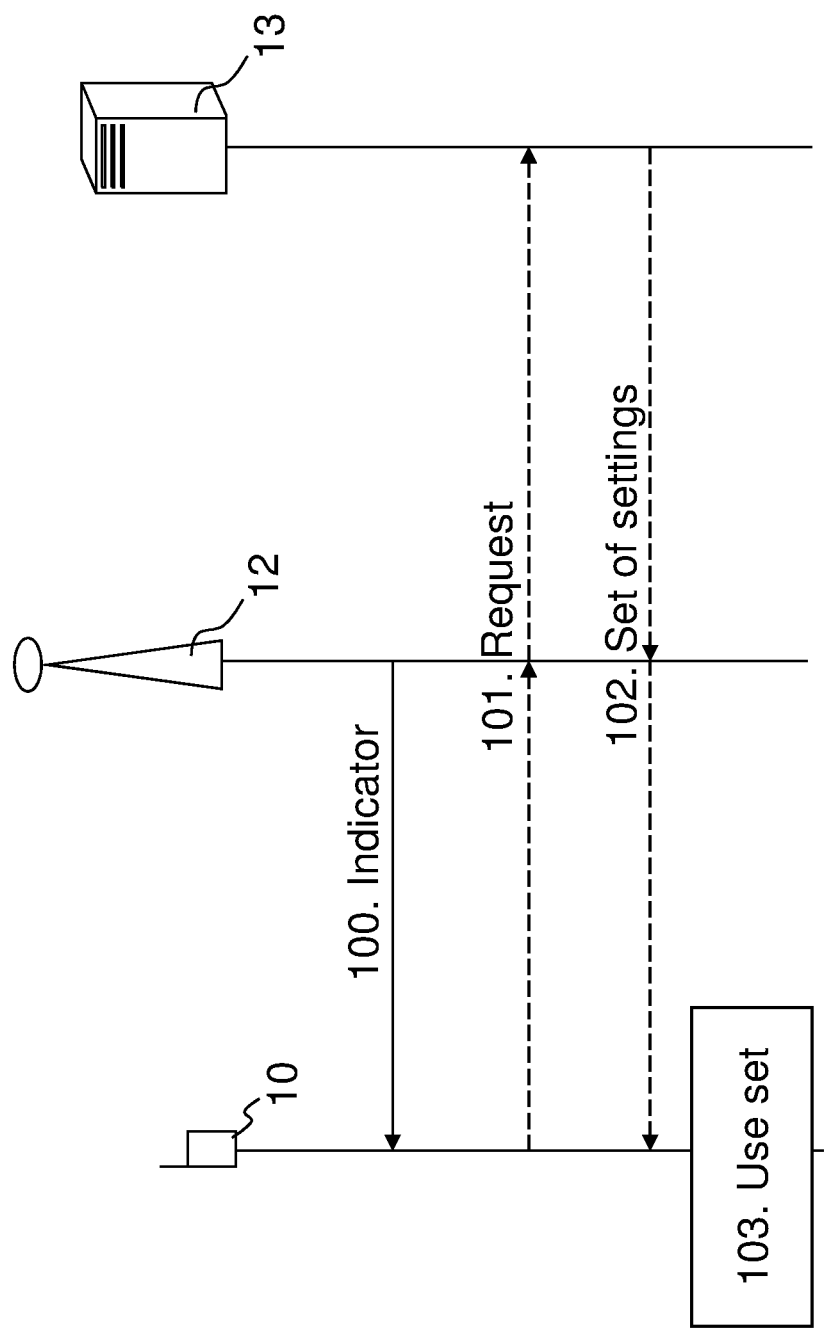
FIG. 18: Combined flowchart and signaling scheme depicting some embodiments herein.

FIG. 18 is a schematic combined flowchart and signaling scheme depicting some embodiments herein. The terminal 10 is served in the cell of the base station 12.

Action 100. The base station 12 transmits the indicator, e.g. an index, to the terminal 10. This may happen when the terminal enters the cell or goes into connected mode. The terminal 10 may also receive the indicator when being in idle mode e.g. when broadcasted in SI.

Action 101. The terminal 10 may if not having the set or if the indicator indicates a retrieval of the set, request the set of settings from the base station 12 or the ANDSF 13.

Action 102. The ANDSF 13 or the base station 12 transmits the set upon receiving the request.

Action 103. The terminal 10 then uses the settings according to the set of settings indicated by the indicator.

Embodiments herein cover setting update such as policy update in a generic case, policy herein also covers rules. For example a policy could be "if parameter_1>threshold_1 and parameter_2<threshold_2 then e.g. choose WLAN, route some traffic to WLAN, etc. In some embodiments only thresholds are communicated in a broadcast and dedicated manner, i.e. the rules will be fixed in the specifications and only thresholds will be communicated via broadcast or thresholds. A policy may be a set of threshold values, and it is known by both the terminal 10 and the network node, due to the rules specified in the 3GPP specifications, on how to use these thresholds.

The method actions in the terminal 10 such as a communication device, a wireless device, or a user equipment, for enabling access to the radio communications network, according to some embodiments will now be described with reference to a flowchart depicted in FIG. 19. The actions do not have to be taken in the order stated below, but may be taken in any suitable order. Actions performed in some embodiments are marked with dashed boxes. The terminal is served in a cell of the radio communications network.

Action 1901. The terminal 10 may receive the set of settings and/or the indicator from a network node such as the base station 12 or the ANDSF 13.

Action 1902. The terminal 10 may further store the set of settings and/or the indicator, e.g. for future use.

Action 1903. The terminal 10 receives an indicator from a base station 12, which indicator indicates a set of settings to use in the cell, and the settings relate to access of the radio communications network. The indicator may be broadcasted in the cell or received over a dedicated channel.

Action 1904. The terminal 10 may further compare the indicated set of settings with a stored or presently used setting set.

Action 1905. The terminal 10 may configure or use the set of settings indicated by the received indicator when being different than a presently used set of settings. E.g. the terminal 10 may configure by transmitting a request requesting the set of settings from a network node, such as the base station 12 or the ANDSF 13. E.g. the base station 12 may send an indicator, e.g. '7', which tells the terminal 10 "when you are in my coverage you should use ANDSF settings '7'". It is then up to the terminal to request from the ANDSF server the ANDSF settings '7'. Another example is where the base station 12 sends, likely broadcasting, the indicator, e.g. '7', and when the terminal realizes that it does not have a configuration corresponding to the broadcasted indicator, let's say the terminal 10 has set of settings '10', then the terminal 10 requests from the base station 12 the current/correct set of setting, which is in this example is set 7. In this case the base station 12 is the provider of the set of settings. The indicator may indicate that the terminal 10 shall update the set used regardless of stored set or indicator.

This may be the case when the terminal 10 has not the indicated set stored or when ordered to override all present sets stored. The terminal 10 may use the indicated set of settings only when a difference between a maintained set indicator and the received indicator is larger than a value N. Furthermore, if a terminal 10 is already using e.g. policy "x" and goes to another cell and the broadcasted/indicated policy there is also "x" then the terminal 10 keeps on using policy "x".

Action 1906. The terminal 10 may furthermore store the indicated set of settings in the terminal 10 e.g. along with cell ID or similar for later use.

The method actions in the network node, such as the base station 12 or the ANDSF 13, for enabling access for the terminal 10 such as a communication device, a wireless device, or a user equipment, to the radio communications network, according to some embodiments will now be described with reference to a flowchart depicted in FIG. 20. The actions do not have to be taken in the order stated below, but may be taken in any suitable order. Actions performed in some embodiments are marked with dashed boxes. The terminal is served in a cell of the radio communications network.

Action 2001. The network node may obtain the set of settings to use in the cell of the network node either by being configured with the set of settings, e.g. receiving the set of settings, or determining the set of settings. The set of settings may be determined based on number of Wi-Fi nodes in the cell, distribution of Wi-Fi nodes in the cell, terminal behavior in the cell, and/or base station capability.

Action 2002. The network node transmits an indicator to the terminal 10, which indicator indicates a set of settings to use in the cell, and the settings relate to access of the radio communications network. The network node may broadcast the indicator or transmit the indicator over a dedicated channel to the terminal 10. The indicator may indicate that the terminal 10 shall update the set used regardless of stored set or indicator.

Action 2003. The network node may receive a request for the set of settings from the terminal 10.

Action 2004. The network node may further transmit the set of settings and/or the indicator to the terminal 10.

Figure 19:
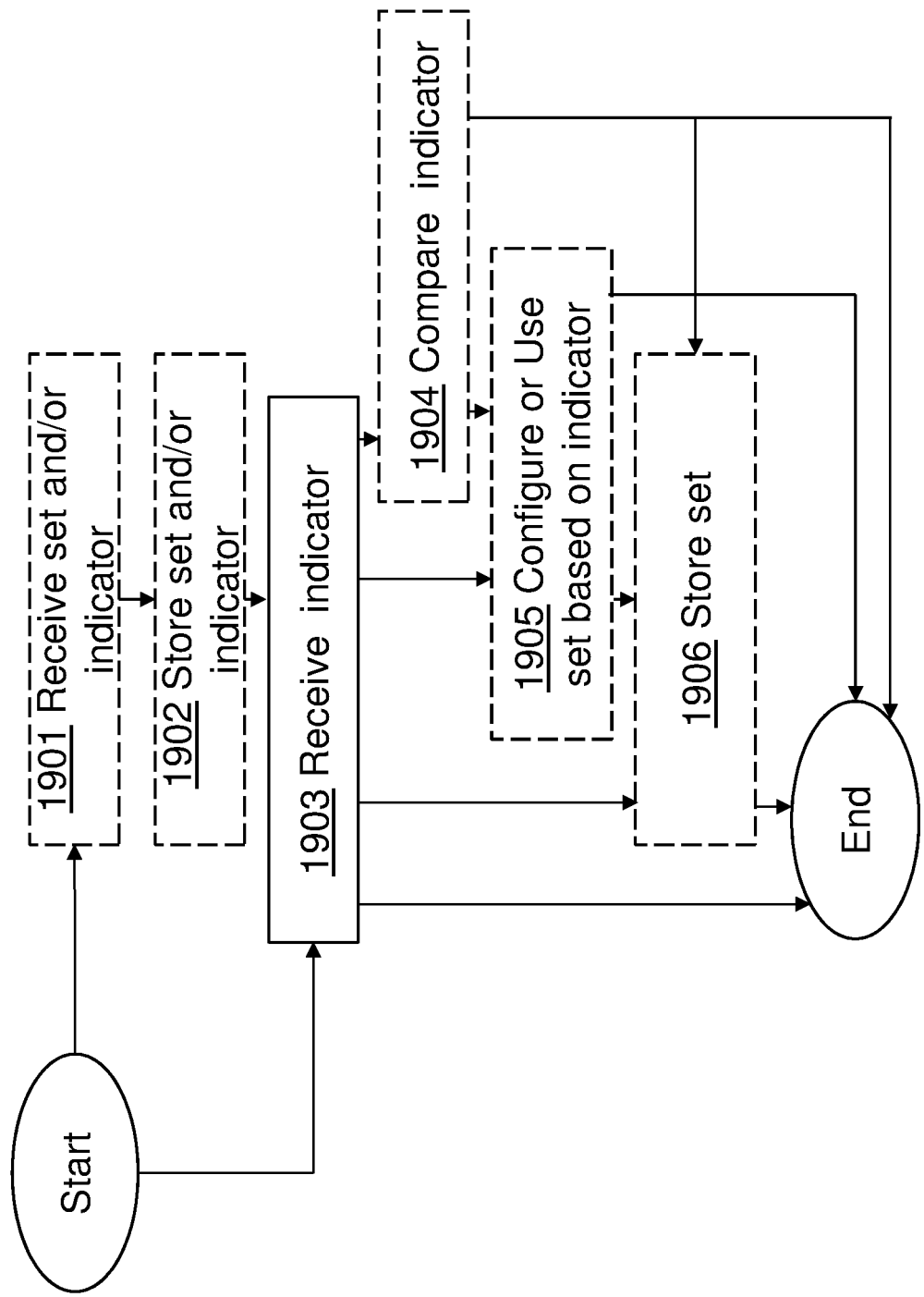
FIG. 19: Flowchart depicting a method in a terminal.
Figure 21:
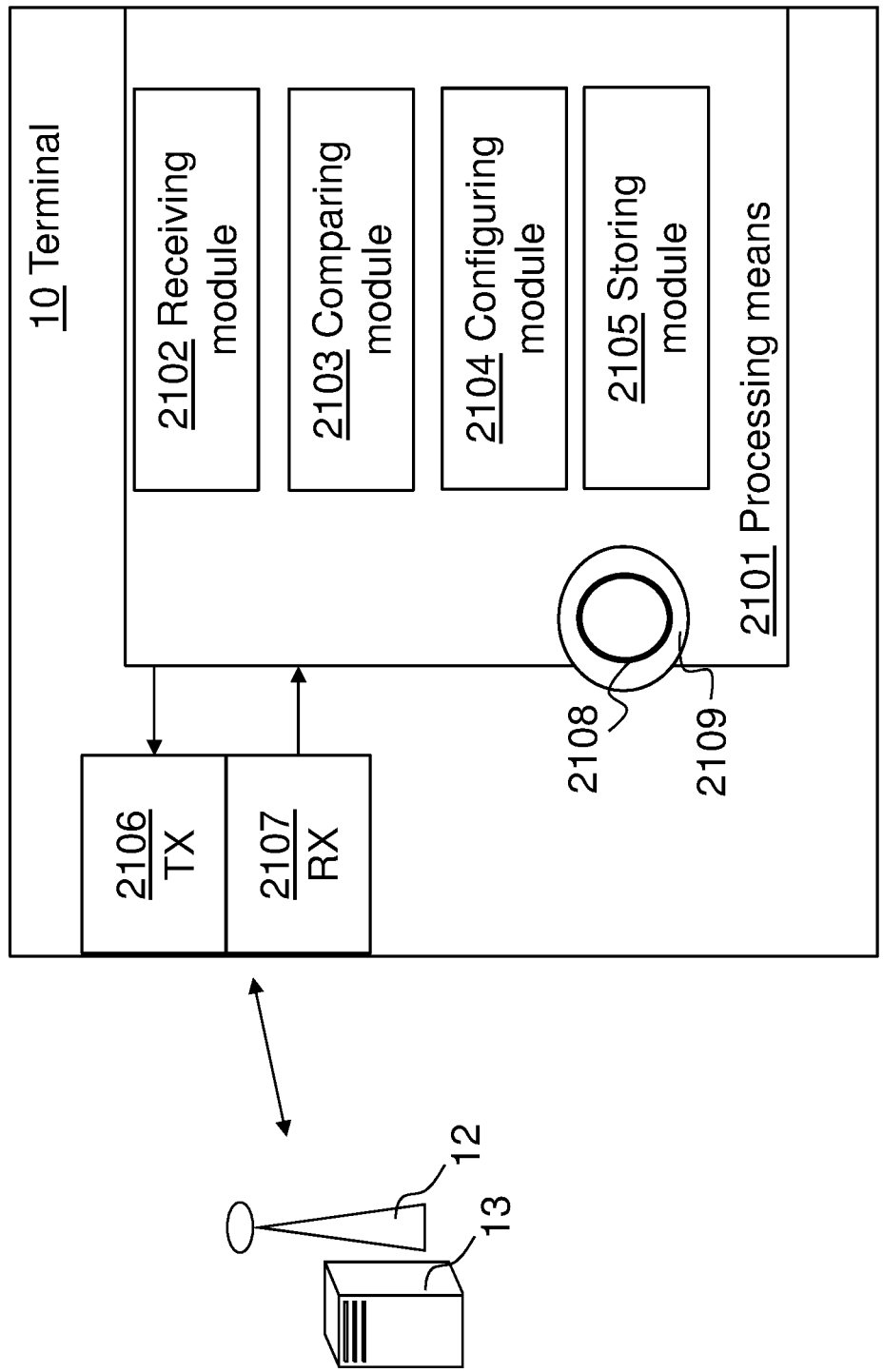
FIG. 21: Block diagram depicting a terminal.

In order to perform the methods herein e.g. described in reference to FIG. 19 a terminal 10 is provided and shown in FIG. 21. FIG. 21 is a block diagram depicting the terminal 10 for enabling access to the radio communications network. The terminal 10 comprises a processing means 2101 configured to receive an indicator from a base station 12, which indicator indicates a set of settings to use in the cell, and the settings relate to access of the radio communications network. E.g. the terminal 10 may comprise a receiving module 2102 configured to receive the indicator. The indicator may be broadcasted in the cell or received over a dedicated channel. The settings may be when to access Wi-Fi and when to access 3GPP network or similar.

The processing means 2101 may also be configured to compare the indicated set of settings with a stored or presently used set. E.g. the terminal may comprise a comparing module 2103 configured to compare the set with a stored or used set.

The processing means 2101 may further be configured to configure or use the set of settings indicated by the received indicator when being different than a presently used set of settings. E.g. the terminal may comprise a configuring module 2104 configured to configure or use the set. The processing means 2101 or configuring module 2104 may e.g. transmit a request requesting the set of settings from the network node. Additionally or alternatively, the processing means 2101 or configuring module 2104 may use the indicated set of settings only when a difference between a maintained set indicator and the received indicator is larger than a value N. The indicator may indicate that the terminal 10 shall update the set used regardless of stored set or indicator.

The processing means 2101 may furthermore be configured to store the indicated set of settings in the terminal 10. The terminal 10 may e.g. comprise a storing module 2105 configured to store the set of settings.

The processing means 2101 may furthermore be configured receive the set of settings and/or the indicator from a network node. The receiving module 2102 may be configured to receive the set of settings and/or the indicator. The processing means 2101 may furthermore be configured to store the set of settings and/or the indicator. The storing module 2105 may e.g. be configured to store the set of settings and/or the indicator. The terminal 10 comprises a transmitter (TX) 2106 configured to transmit e.g. the request, and a receiver (RX) 2107 configured to receive e.g. the indicator. The transmitter and receiver may be implemented as a transceiver.

The embodiments herein for enabling access may be implemented through processing means 2101 such as one or more processors in the terminal 10 depicted in FIG. 21, together with computer program code for performing the functions and/or method actions of the embodiments herein. The methods according to the embodiments described herein for the terminal 10 are respectively implemented by means of e.g. a computer program 2108 or a computer program product, comprising instructions, i.e., software code portions, which, when executed on at least one processor, cause the at least one processor to carry out the actions described herein, as performed by the terminal 10. The computer program 2108 may be stored on a computer-readable storage medium 2109, e.g. a disc or similar. The computer-readable storage medium 2109, having stored thereon the computer program, may comprise the instructions which, when executed on at least one processor, cause the at least one processor to carry out the actions described herein, as performed by the terminal 10. In some embodiments, the computer-readable storage medium may be a non-transitory computer-readable storage medium.

Figure 20:
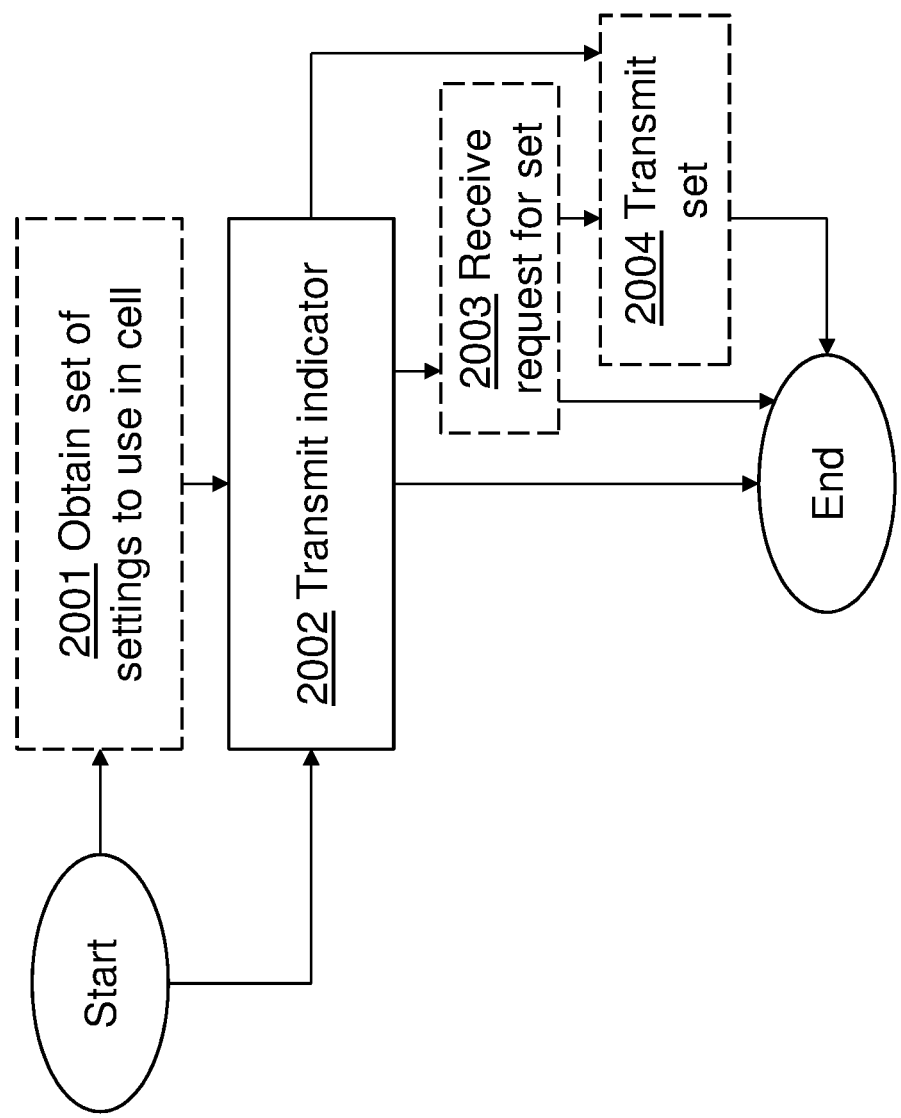
FIG. 20: Flowchart depicting a method in a network node.
Figure 22:
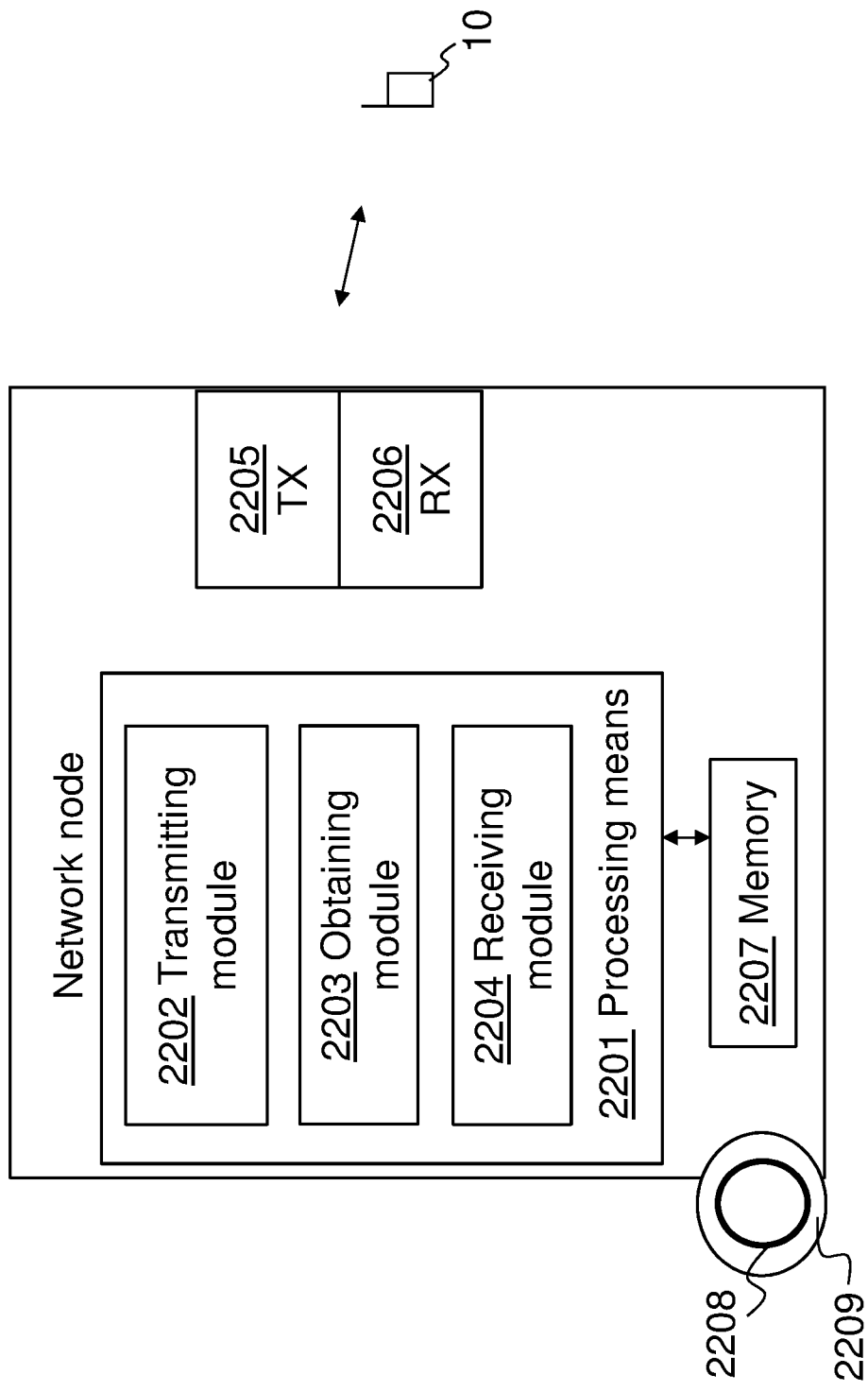
FIG. 22: Block diagram depicting a network node.

In order to perform the methods herein e.g. described in reference to FIG. 20 a network node, e.g. the base station 12 or the ANDSF 13, is provided and shown in FIG. 22. FIG. 22 is a block diagram depicting the network node for enabling access for the terminal 10 to the radio communications network. The terminal 10 is served in a cell of the radio communications network. The network node comprises a processing means 2201 configured to transmit an indicator to the terminal 10, which indicator indicates a set of settings to use in the cell, and the settings relate to access of the radio communications network. The processing means 2201 may be configured to broadcast the indicator or to transmit the indicator over a dedicated channel to the terminal 10. The network node may e.g. comprise a transmitting module 2202 configured to transmit the indicator. The indicator may indicate that the terminal 10 shall update the set used regardless of stored set or indicator.

The processing means 2201 may be configured to obtain the set of settings to use in the cell of the network node either by being configured with the set of settings, or determining the set of settings. The network node may e.g. comprise an obtaining module 2203 configured to obtain the set. The processing means 2201 may be configured to determine the set of settings to use based on number of Wi-Fi nodes in the cell, distribution of Wi-Fi nodes in the cell, terminal behavior in the cell, and/or base station capability.

The processing means 2201 may further be configured to receive a request for the set of settings from the terminal 10. E.g. the network node may comprise a receiving module 2204 configured to receive the request.

The processing means 2201 may further be configured to transmit the set of settings and/or the indicator to the terminal 10 e.g. as in response of receiving the request. The transmitting module 2202 may e.g. be configured to transmit the set.

The network node may comprise a transmitter (TX) 2205 configured to transmit the indicator and/or set, and a receiver (RX) 2206 configured to receive the request etc.

The network node further comprises a memory 2207 which may be configured to store data thereon, such as set of settings, indicators, cell IDs, applications to perform the method herein, and/or similar.

The embodiments herein for enabling access may be implemented through processing means 2201 such as one or more processors in the network node depicted in FIG. 22, together with computer program code for performing the functions and/or method actions of the embodiments herein. The methods according to the embodiments described herein for the network node are respectively implemented by means of e.g. a computer program 2208 or a computer program product, comprising instructions, i.e., software code portions, which, when executed on at least one processor, cause the at least one processor to carry out the actions described herein, as performed by the terminal 10. The computer program 2208 may be stored on a computer-readable storage medium 2209, e.g. a disc or similar. The computer-readable storage medium 2209, having stored thereon the computer program, may comprise the instructions which, when executed on at least one processor, cause the at least one processor to carry out the actions described herein, as performed by the terminal 10. In some embodiments, the computer-readable storage medium may be a non-transitory computer-readable storage medium.

As will be readily understood by those familiar with communications design, that functions from modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a terminal for enabling access to a radio communications network, the method comprising:
   receiving a policy set indicator transmitted from a base station for a cell where the terminal is located, wherein the policy set indicator indicates a set of policies controlling access network selection and traffic steering in the cell;

determining from the policy set indicator whether a current set of policies stored at the terminal apply to the cell;

responsive to determining that the current set of policies apply to the cell, operating in the cell according to an indicated or selected one of the policies in the current set of policies; and responsive to determining that the current set of policies do not apply to the cell, updating the current set of policies by requesting a policy update from the radio communications network and operating in the cell according to an indicated or selected one of the policies in the updated current set of policies.

2. The method according to claim 1, wherein determining from the policy set indicator whether the current set of policies stored at the terminal apply to the cell comprises determining whether the policy set indicator differs from a policy set indicator stored at the terminal that identifies the current policy set stored at the terminal.

3. The method according to claim 1, wherein determining from the policy set indicator whether the current set of policies stored at the terminal apply to the cell comprises determining whether there are more than a predefined number of differences between a policy set identified by the policy set indicator and the current policy set stored at the terminal.

4. The method according to claim 1, further comprising receiving the policy set indicator on a broadcast channel and, when the policy update is requested, receiving the policy update over a dedicated channel.

5. The method according to claim 1, wherein determining from the policy set indicator whether the current set of policies stored at the terminal apply to the cell comprises determining whether the policy set indicator indicates that the terminal shall unconditionally update the current set of policy setting stored at the terminal.

6. The method of claim 1, wherein receiving the policy set indicator comprises receiving the policy set indicator on a broadcast channel of the cell while the terminal operates in an IDLE mode, and wherein the method further comprises, when requesting the policy update, transitioning the terminal from the IDLE mode to a CONNECTED mode and obtaining the policy update via a dedicated channel established for the terminal while operating in the CONNECTED mode.

7. A method in a network node for enabling access to a radio communications network, the method comprising:

transmitting, for each of one or more cells of the radio communications network, a policy set indicator that indicates a set of policies controlling access network selection and traffic steering in the cell, such that terminals moving between two cells recognize from the policy set indicators respectively transmitted in the two cells whether the two cells use the same policy set or use different policy sets; and transmitting, for each of the one or more cells, information comprising the set of policies used in the cell, in response to receiving a policy update request from a terminal operating in the cell.

8. The method according to claim 7, wherein, for each cell among the one or more cells, the network node broadcasts the policy set indicator.

9. The method according to claim 7, wherein the method further includes, for a given cell among the one or more cells, and with respect to at least one terminal operating in the given cell, transmitting an index value indicating a particular policy in the set of policies applicable to the given cell, to be applied by the at least one terminal for operation in the given cell.

10. The method according to claim 7, further comprising determining the set of policies for each cell among the one or more cells based on at least one of: a number of Wi-Fi nodes in the cell, a distribution of Wi-Fi nodes in the cell, terminal behavior in the cell, and a base station capability of a base station serving the cell.

11. The method according to claim 7, wherein transmitting the policy update comprises, for a given terminal in a given one of the one or more cells, transmitting the policy update over a dedicated channel established with the given terminal in the given cell.

12. The method according to claim 7, wherein transmitting the policy set indicator in a given one of the one or more cells comprises transmitting an indicator to at least one terminal in the cell that the at least one terminal shall unconditionally update any current set of policy settings stored at the terminal.

13. A terminal for enabling access to a radio communications network, the terminal comprising:

transceiver circuitry configured for accessing the radio communications network; and a processing circuit configured to:

receive a policy set indicator from a base station for a cell where the terminal is located, wherein the policy set indicator indicates a set of policies controlling access network selection and traffic steering in the cell determine from the policy set indicator whether a current set of policies stored at the terminal apply to the cell;

responsive to determining that the current set of policies apply to the cell, operate in the cell according to an indicated or selected one of the policies in the current set of policies; and responsive to determining that the current set of policies do not apply to the cell, update the current set of policies by requesting a policy update from the radio communications network and operate in the cell according to an indicated or selected one of the policies in the updated current set of policies.

14. The terminal according to claim 13, wherein the processing circuit is configured to determine from the policy set indicator whether the current set of policies stored at the terminal apply to the cell by determining whether the policy set indicator differs from a policy set indicator stored at the terminal that identifies the current policy set stored at the terminal.

15. The terminal according to claim 13, wherein the processing circuit is configured to determine from the policy set indicator whether the current set of policies stored at the terminal apply to the cell by determining whether there are more than a predefined number of differences between a policy set identified by the policy set indicator and the current policy set stored at the terminal.

16. The terminal according to claim 13, wherein the processing circuit is configured to receive the policy set indicator on a broadcast channel and, when the policy update is requested, to receive the policy update over a dedicated channel.

17. The terminal according to claim 13, wherein the processing circuitry is configured to determine from the policy set indicator whether the current set of policies stored at the terminal apply to the cell by determining whether the policy set indicator indicates that the terminal shall unconditionally update the current set of policy settings stored at the terminal.

18. The method of claim 13, wherein receiving the processing circuit is configured to receive the policy set indicator on a broadcast channel of the cell while the terminal operates in an IDLE mode, and, when requesting the policy update, the processing circuit is configured to transition the terminal from the IDLE mode to a CONNECTED mode and obtain the policy update via a dedicated channel established for the terminal while operating in the CONNECTED mode.

19. A network node for enabling access to a radio communications network, the network node comprising:
 a transceiver; and
 a processing circuit configured to:
  transmit via the transceiver, for each of one or more cells of the radio communications network, a policy set indicator that indicates a set of policies controlling access network selection and traffic steering in the cell, such that terminals moving between two cells recognize from the policy set indicators respectively transmitted in the two cells whether the two cells use the same policy set or use different policy sets; and
  transmit via the transceiver, for each of the one or more cells, information comprising the set of policies used in the cell, in response to receiving a policy update request from a terminal operating in the cell.

20. The network node according to claim 19, wherein, for each cell among the one or more cells, the processing circuit is configured to broadcast the policy set indicator.

21. The network node according to claim 19, wherein the processing circuit is configured to, for a given cell among the one or more cells, and with respect to at least one terminal operating in the given cell, transmit an index value indicating a particular policy in the set of policies applicable to the given cell, to be applied by the at least one terminal for operation in the given cell.

22. The network node according to claim 21, wherein the processing circuit is configured to determine the set of settings policies for each cell among the one or more cells based on at least one of: a number of Wi-Fi nodes in the cell, a distribution of Wi-Fi nodes in the cell, terminal behavior in the cell, and a base station capability of a base station serving the cell.

23. The network node according to claim 19, wherein the processing circuit is configured to transmit the policy update by, for a given terminal in a given one of the one or more cells, transmitting the policy update over a dedicated channel established with the given terminal in the given cell.

24. The network node according to claim 19, wherein the processing circuit is configured to transmit the policy set indicator in a given one of the one or more cells to at least one terminal in the given cell as an indicator that indicates that the at least one terminal shall unconditionally update any current set of policy settings stored at the terminal.

25. A method of operation in a terminal configured for operation in a radio communications network, the method comprising:
 receiving a first policy set indicator for a first cell of the radio communications network and operating in the first cell according to a policy for radio network access and traffic steering included in a first set of policies corresponding to the first policy set indicator;
 subsequently moving to a second cell of the radio communications network and receiving a second policy set indicator for the second cell of the radio communications network; and
 responsive to determining that the second policy set indicator differs from the first policy set indicator, adopting a second set of policies corresponding to the second policy set indicator, and operating in the second cell according to a policy for radio network access and traffic steering included in the second set of policies;
 wherein the first and second sets of policies are among a number of sets of policies, each set of policies defining policies governing radio access network selection and traffic steering by terminals operating in any given cell to which the set of policies applies.

* * * * *